(12) United States Patent
Dayrit et al.

(10) Patent No.: US 10,189,621 B2
(45) Date of Patent: Jan. 29, 2019

(54) BAG MADE FROM HIGH-STRENGTH HEAT-SHRINKABLE FILM EXHIBITING DIRECTIONAL TEAR, AND PROCESS UTILIZING SAME

(75) Inventors: Richard M. Dayrit, Simpsonville, SC (US); Robert A. Odabashian, Greer, SC (US); Janet W. Rivett, Simpsonville, SC (US); Thomas D. Kennedy, Simpsonville, SC (US); Diana Huerta, Moore, SC (US); Tom Bonner, Greer, SC (US); Rodney R. Hodgson, Greenville, SC (US); Mendy W. Mossbrook, Woodruff, SC (US); H. Walker Stockley, Spartanburg, SC (US)

(73) Assignee: Cryovac, Inc., Charlotte, NC (US)

( * ) Notice: Subject to any disclaimer, the term of this patent is extended or adjusted under 35 U.S.C. 154(b) by 2579 days.

(21) Appl. No.: 11/895,960

(22) Filed: Aug. 28, 2007

(65) Prior Publication Data
US 2008/0292225 A1    Nov. 27, 2008

Related U.S. Application Data

(60) Provisional application No. 60/931,270, filed on May 21, 2007.

(51) Int. Cl.
| B65D 75/00 | (2006.01) |
| B32B 27/08 | (2006.01) |
| B65D 75/58 | (2006.01) |

(52) U.S. Cl.
CPC ............ *B65D 75/002* (2013.01); *B32B 27/08* (2013.01); *B65D 75/5805* (2013.01); *Y02W 30/801* (2015.05)

(58) Field of Classification Search
CPC .. B65D 75/002; B65D 75/5805; B32B 27/08; Y02W 30/801

(Continued)

(56) References Cited

U.S. PATENT DOCUMENTS 3,405,796 A * 10/1968 Misik ........................... 206/525
3,516,537 A    6/1970 Dreyfus et al.
(Continued)

FOREIGN PATENT DOCUMENTS

| EP | 0 940 251 A1 | 9/1999 |
| EP | 0 957 044 | 11/1999 |

(Continued)

OTHER PUBLICATIONS

U.S. Appl. No. 12/152,686, filed May 16, 2008, Dayrit et al.
(Continued)

*Primary Examiner* — Peter Helvey
(74) *Attorney, Agent, or Firm* — Jason R. Womer

(57) ABSTRACT

A heat-shrinkable bag has a means for initiating a manual tear that can be propagated to open the bag and allow a product to be readily removed therefrom, without the use of a knife or scissors or any other implement. The bag is made from a heat-shrinkable multilayer film having a Peak Load Impact Strength of at least 50 Newtons per mil. The means for initiating tearing results in a first tear in the first side of the bag, and a second tear in the second side of the bag. The first tear and the second tear are each capable of being manually propagated through a heat seal and across the bag, or down the length of the bag, with the tear being capable of being manually propagated through and to an opposite bag edge, so that the product inside a package can be readily removed from the bag. A process for making a package and manually opening the package, comprises placing a product inside the bag, sealing the bag closed, shrinking the film around the product, manually initiating and manually propagating the first and second tears, and readily removing the product from the bag.

20 Claims, 27 Drawing Sheets

(58) Field of Classification Search
USPC .................. 383/37, 201, 207, 908; 53/467
See application file for complete search history.

(56) References Cited

U.S. PATENT DOCUMENTS

| | | | |
|---|---|---|---|
| 4,064,296 | A | 12/1977 | Bornstein et al. |
| 4,098,406 | A | 7/1978 | Otten et al. |
| 4,113,139 | A | 9/1978 | Berry et al. |
| 4,120,716 | A * | 10/1978 | Bonet .................... 156/272.6 |
| 4,278,738 | A | 7/1981 | Brax et al. |
| 4,598,826 | A * | 7/1986 | Shinbach ................. 383/200 |
| 4,755,403 | A | 7/1988 | Ferguson |
| 4,768,411 | A | 9/1988 | Su |
| 4,778,058 | A | 10/1988 | Yamazaki et al. |
| 4,861,414 | A | 8/1989 | Vogan |
| 4,958,735 | A | 9/1990 | Odabashian |
| 5,126,211 | A | 6/1992 | Mitzutani et al. |
| 5,127,065 | A | 6/1992 | Wade |
| 5,308,668 | A | 5/1994 | Tsuji |
| 5,413,412 | A | 5/1995 | Odabashian |
| 5,540,646 | A | 7/1996 | Williams et al. |
| 5,545,419 | A | 8/1996 | Brady et al. |
| 5,556,674 | A | 9/1996 | Meilhon |
| 5,852,152 | A | 12/1998 | Walton et al. |
| 5,891,500 | A * | 4/1999 | Brodie, III ................ 426/415 |
| 5,921,390 | A * | 7/1999 | Simhaee .................. 206/390 |
| 5,966,898 | A | 10/1999 | Su |
| 5,984,088 | A * | 11/1999 | Dietz et al. ............... 206/205 |
| 6,054,209 | A | 4/2000 | Imanishi et al. |
| 6,060,137 | A | 5/2000 | Akao |
| 6,203,867 | B1 | 3/2001 | Derkach et al. |
| 6,221,502 | B1 | 4/2001 | Takashige et al. |
| 6,260,705 | B1 | 7/2001 | Montepiani et al. |
| 6,270,819 | B1 | 8/2001 | Wiese |
| 6,296,886 | B1 | 10/2001 | DePoorter et al. |
| 6,342,258 | B1 * | 1/2002 | Berings et al. ............... 426/79 |
| 6,361,856 | B1 | 3/2002 | Wakai et al. |
| 6,383,537 | B1 | 5/2002 | Brady et al. |
| 6,476,137 | B1 | 11/2002 | Longo |
| 6,479,137 | B1 | 11/2002 | Joyner et al. |
| 6,499,598 | B2 | 12/2002 | Montepiani et al. |
| 6,663,905 | B1 | 12/2003 | Ennis et al. |
| 6,708,826 | B1 | 3/2004 | Ginsberg et al. |
| 6,764,729 | B2 | 7/2004 | Ramesh et al. |
| 6,780,373 | B1 | 8/2004 | Musco |
| 6,790,468 | B1 | 9/2004 | Mize, Jr. et al. |
| 6,979,494 | B2 | 12/2005 | Berrier et al. |
| 7,048,125 | B2 * | 5/2006 | Mize et al. .................. 206/497 |
| 7,118,792 | B2 | 10/2006 | Hewitt et al. |
| 7,255,903 | B1 * | 8/2007 | Mudar et al. ............... 428/34.9 |
| 7,331,159 | B2 | 2/2008 | Osgood |
| 7,338,691 | B2 * | 3/2008 | Pollok et al. .............. 428/34.9 |
| 7,357,255 | B2 | 4/2008 | Ginsberg et al. |
| 2002/0126919 | A1 * | 9/2002 | Jackson et al. .............. 383/42 |
| 2003/0021870 | A1 * | 1/2003 | Pollok et al. .............. 426/412 |
| 2004/0043169 | A1 | 3/2004 | Subramanian et al. |
| 2004/0109963 | A1 | 6/2004 | Zaggia et al. |
| 2004/0118735 | A1 | 6/2004 | Mize et al. |
| 2004/0166262 | A1 | 8/2004 | Busche et al. |
| 2004/0175464 | A1 | 9/2004 | Blemberg et al. |
| 2004/0175465 | A1 | 9/2004 | Buelow et al. |
| 2004/0175466 | A1 | 9/2004 | Douglas et al. |
| 2004/0175467 | A1 | 9/2004 | Mueller et al. |
| 2004/0175592 | A1 | 9/2004 | Douglas et al. |
| 2004/0241481 | A1 * | 12/2004 | Ichige et al. ............... 428/515 |
| 2005/0053313 | A1 * | 3/2005 | Lucas et al. ................ 383/16 |
| 2005/0058793 | A1 | 3/2005 | Schaefer et al. |
| 2005/0069719 | A1 | 3/2005 | Blemberg et al. |
| 2005/0118373 | A1 | 6/2005 | Blemberg et al. |
| 2005/0118374 | A1 | 6/2005 | Douglas et al. |
| 2006/0073317 | A1 | 4/2006 | Sato et al. |
| 2006/0134287 | A1 | 6/2006 | Vimini et al. |
| 2006/0188619 | A1 | 8/2006 | Vimini et al. |
| 2006/0199912 | A1 | 9/2006 | Fuchs et al. |
| 2006/0286321 | A1 * | 12/2006 | Broadus et al. ............. 428/35.7 |
| 2007/0009699 | A1 | 1/2007 | Hewitt et al. |
| 2007/0221532 | A1 | 9/2007 | DiLiberto |
| 2008/0179780 | A1 | 7/2008 | Broadus et al. |
| 2008/0182051 | A1 | 7/2008 | Broadus et al. |
| 2008/0182052 | A1 | 7/2008 | Broadus et al. |
| 2008/0182053 | A1 | 7/2008 | Broadus et al. |
| 2008/0292225 | A1 * | 11/2008 | Dayrit et al. ............... 383/207 |
| 2008/0292821 | A1 * | 11/2008 | Dayrit et al. ............... 428/34.9 |
| 2009/0017239 | A1 | 1/2009 | Ursino |
| 2009/0116768 | A1 * | 5/2009 | Huerta et al. .............. 383/207 |

FOREIGN PATENT DOCUMENTS

| | | |
|---|---|---|
| EP | 1 295 908 | 3/2003 |
| EP | 1 769 908 | 4/2007 |
| FR | 2 849 835 A | 7/2004 |
| GB | 1 270 281 | 4/1972 |
| GB | 2 397 065 | 7/2004 |
| JP | 1153733 | 6/1989 |
| JP | 7009550 A | 1/1995 |
| JP | 7125756 A | 5/1995 |
| JP | 7299853 A | 11/1995 |
| JP | 7299857 A | 11/1995 |
| JP | 7299859 A | 11/1995 |
| JP | 9052966 A | 2/1997 |
| JP | 9053008 | 2/1997 |
| JP | 9111060 A | 4/1997 |
| JP | 9141791 A | 6/1997 |
| JP | 10 237 234 A | 9/1998 |
| JP | 63 275644 | 11/1998 |
| JP | 2833970 B2 | 12/1998 |
| JP | 2000169597 A | 6/2000 |
| JP | 2001064456 A | 3/2001 |
| JP | 3356200 | 12/2002 |
| JP | 2003201377 A | 7/2003 |
| JP | 2003 341687 | 12/2003 |
| JP | 2006063134 | 3/2004 |
| JP | 2005161671 | 6/2005 |
| JP | 02006240717 A | 9/2006 |
| JP | 2008024744 | 2/2008 |
| WO | WO 99/54398 | 10/1999 |
| WO | WO 2007/082347 | 7/2007 |
| WO | WO 98/28132 | 7/2008 |

OTHER PUBLICATIONS

U.S. Appl. No. 12/313,396, filed Nov. 20, 2007, Compton.
ASTM D 638-00, Standard Test Method for Tensile Properties of Plastics, pp. 1-13.
ASTM D 882-90, Standard test Methods for Tensile Properties of Thin Plastic Sheeting, pp. 194-199.
ASTM D 2732-03, Standard Test Method for Unrestrained Linear Thermal Shrinkage of Plastic Film and Sheeting, pp. 1-5.
ASTM D 3763-95A, Standard Test Method for High Speed Puncture properties of Plastics Using Load and Displacement Sensors, Peak Load Impact Strength, pp. 1-6.
ASTM D 4065-01, Standard Practice for Plastics: Dynamic Mechanical properties: Determination and Report of Procedures, pp. 1-5.
ASTM D 5026-95a, Standard Test Method for Measuring the dynamic Mechanical properties of Plastics in Tension, pp. 1-4.
PCT/US2008/006444 International Search Report.
PCT/US2008/006444 Written Opinion of the International Searching Authority.
PCT/US2009/003023 International Search Report.
PCT/US2009/003023 Written Opinion of the International Searching Authority.
Patel, Saaavedra, Hinton and DeGroot, Comparison of EVA and Polyolefm Plastomer as Blend Components in Various Film Applications, Journal of Plastic Film and Sheeting, vol. 14, pp. 344-355 (Oct. 1998).
Surround™ Shrink Bags with Lift & Peel Opening Technology, Curwood Bemis product brochure (undated)_).
Wu et al, "Study on the Morphology and Properties of Metallocene Polyethylene and Ethylene/Vinyl Acetate Blends", Journal of Applied Polymer Science, vol. 91, 905-910 (2004).

* cited by examiner

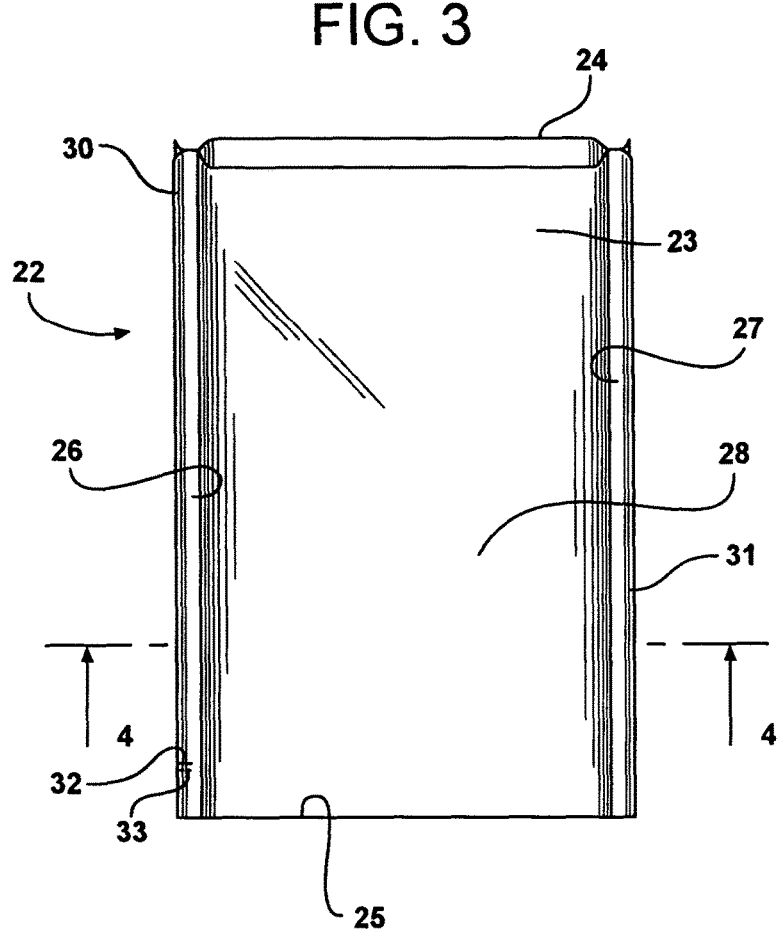
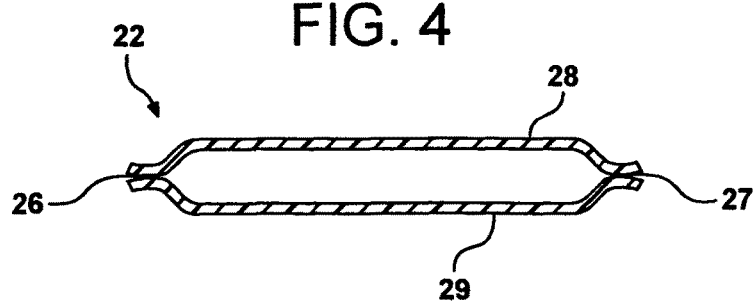

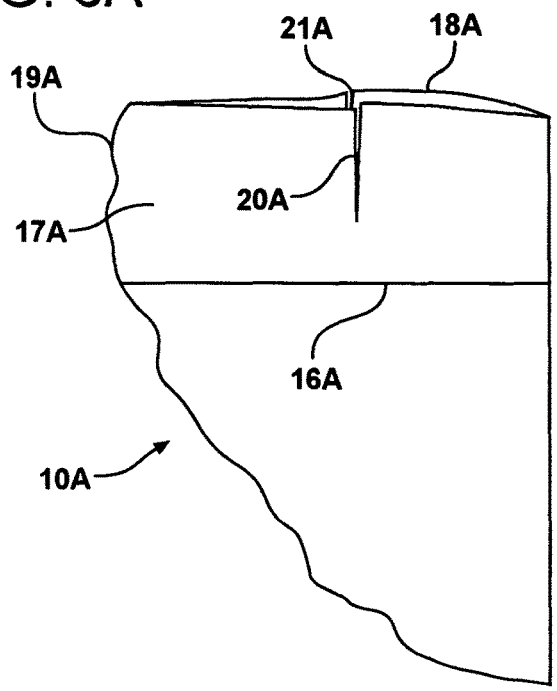
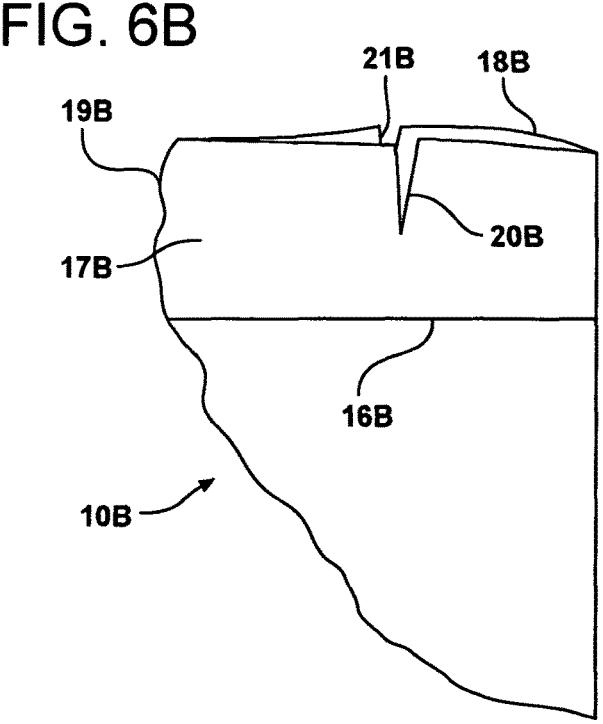

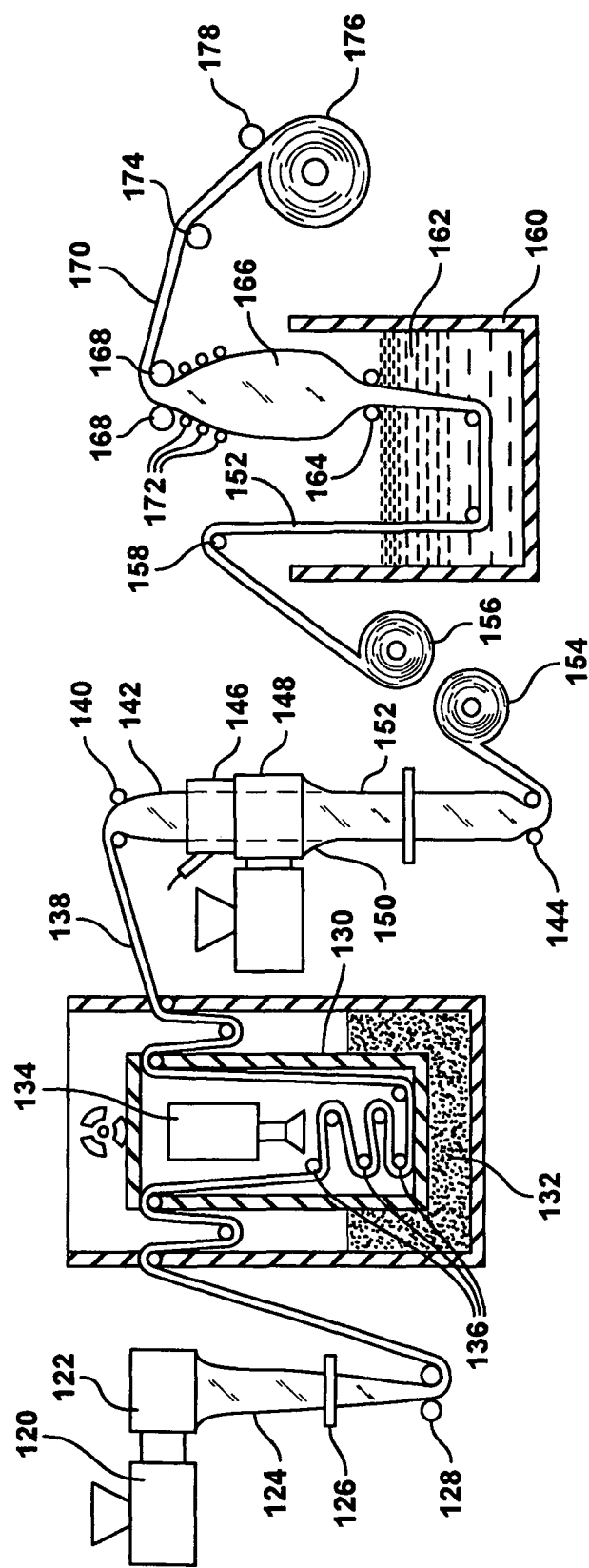

(Comparative)

BAG MADE FROM HIGH-STRENGTH HEAT-SHRINKABLE FILM EXHIBITING DIRECTIONAL TEAR, AND PROCESS UTILIZING SAME

This application claims the benefit of Provisional Application No. 60/931,270, Filed at the United States Patent and Trademark Office on May 21, 2007.

FIELD

The present invention pertains to heat-shrinkable bags that are easy to open, particularly bags for food packaging end use.

BACKGROUND

For several decades, heat-shrinkable bags have been used for the packaging of a variety of products. Food, particularly meat, has been vacuum packaged in such bags. Through the years, these heat-shrinkable bags have developed higher impact strength and higher seal strength, while simultaneously becoming easier to seal, having improved oxygen and moisture barrier properties, and having higher total free shrink at lower temperatures. High seal strength, high impact strength, and high puncture-resistance are particularly important for the packaging of fresh meat products, as leaking packages are less desirable to consumers and retailers alike. Moreover, leaking packages reduce shelf life by allowing atmospheric oxygen and microbes to enter the package.

As a result, the bags used for food packaging, particularly meat packaging, have evolved into being quite tough, and therefore difficult to open. Typically, knives and scissors are used for opening the bags that have been evacuated, sealed around, and shrunken against the food product in the package. The use of knives and scissors to open these tough bags increases the risk of injury for consumers and retailers. Moreover, the opening of such tough packaging requires more time and effort due to the toughness of the shrunken bag. For many years, the marketplace has desired a tough, heat-shrinkable, bag that can be opened quickly and easily, without the need for knives and scissors, so that the product can be easily removed from the bag.

SUMMARY

The heat-shrinkable bag of the invention has a means for manually initiating a manual tear that opens the bag and allows the product to be readily removed from the torn bag, without the use of a knife or scissors or any other implement. A first aspect is directed to a heat-shrinkable bag comprising a heat-shrinkable multilayer film having an inside seal layer heat sealed to itself at a heat seal. The bag has a first side, a second side, an open top, and a bag skirt outward of the heat seal. The bag skirt comprises a bag edge and a first means for initiating tearing, the first means being in the first side of the bag. The bag skirt also comprises a second means for initiating tearing, the second means being in the second side of the bag. The bag is capable of having a manually-initiated, manually-propagated first tear in the first side of the bag, and a manually-initiated and manually-propagated second tear in the second side of the bag. The first tear and the second tear are each capable of being propagated from the respective first and second means for initiating tearing, with each tear being manually propagated through the heat seal and across the bag, or down the length of the bag, with the tear being capable of being manually propagated through and to an opposite bag edge. Upon making a package by placing a product inside the bag, sealing the bag closed so that a package is formed, and shrinking the film around the product, the resulting package can be manually opened, and the product readily removed from the bag, by manually initiating tears from the first and second means for initiating tearing, with the tears being manually propagated through the seal and toward the opposite bag edge. The multilayer film exhibits a Peak Load Impact Strength, determined using ASTM D 3763-95A, of at least 50 Newtons per mil. Optionally, the atmosphere can be evacuated from the bag before the bag is sealed closed with the product therein.

A second aspect pertains to a process for making a package and manually opening the package, comprising: (A) placing a product inside a heat-shrinkable bag; (B) sealing the bag closed so that a package is formed, and (C) shrinking the film around the product, (D) manually initiating and manually propagating a first tear in the first side of the bag, and a second tear in the second side of the bag, the first tear and the second tear each being manually propagated from the respective first and second means for initiating tearing, with each tear being manually propagated through the heat seal and across the bag, or down the length of the bag, with the first and second tears being manually propagated towards an opposite bag edge, so that the product can be readily removed from the bag. Optionally, the atmosphere can be evacuated from the bag before the bag is sealed closed with the product therein. The bag used in the process is a bag in accordance with the first aspect set forth above. The process further encompasses using any such bags described herein.

BRIEF DESCRIPTION OF THE DRAWINGS

FIG. 3 is a schematic of a first heat-shrinkable, side-seal bag in lay-flat configuration.

FIG. 4 is a transverse cross-sectional view of the heat-shrinkable, side-seal bag of FIG. 3

FIGS. 6M, 6N, 6O, 6P, 6Q, 6R, 6S, 6T, 6U, 6V, 6W, 6X, 6Y, 6Z, 6AA, 6BB, 6CC, 6DD, 6EE, and 6FF are enlarged detailed views of various alternative tear initiation features, some of which include means for manual grip enhancement.

FIG. 8 is a schematic view of the process used to make various heat-shrinkable, seamless film tubings set forth in several of the examples below, this tubing thereafter being converted into end-seal and side-seal bags by heat sealing and cutting operations (not illustrated).

DETAILED DESCRIPTION

Figure 1A:
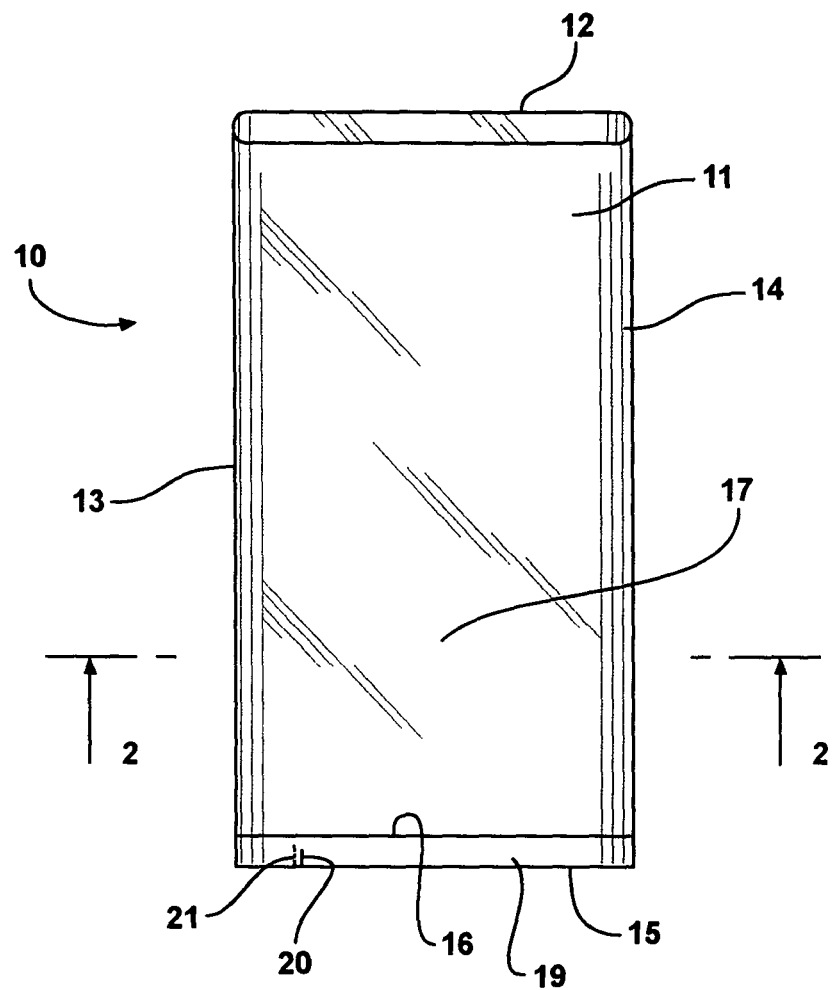
FIG. 1A is a schematic of a first heat-shrinkable, end-seal bag in lay-flat configuration.

As used herein, the term "film" is inclusive of plastic web, regardless of whether it is film or sheet. The film can have a total thickness of 0.25 mm or less, or a thickness of from 1.5 mils to 10 mils, or from 1.5 to 5 mils, or from 1.8 mils to 4 mils, or from 2 mils to 3 mils.

The multilayer, heat-shrinkable film from which the bag is made exhibits a Peak Load Impact Strength, determined using ASTM D 3763-95A, of at least 50 Newtons per mil. ASTM D 3763-95A is hereby incorporated, in its entirety, by reference thereto. The heat-shrinkable film can have a Peak Load Impact Strength, determined using ASTM 3763-95A, of from 50 to 250 Newtons per mil, or from 60 to 200 Newtons per mil, or from 70 to 170 Newtons per mil; or from 80 to 150 Newtons per mil; or from 85 to 140 Newtons per mil; or from 95 to 135 Newtons per mil.

As used herein, the phrase "machine direction" refers to the direction in which the film emerges from the die. Of course, this direction corresponds with the direction the extrudate is forwarded during the film production process. The phrase "machine direction" corresponds with "longitudinal direction". Machine direction and longitudinal direction are abbreviated as "MD" and "LD", respectfully.

However, as used herein, the phrase "machine direction" includes not only the direction along a film that corresponds with the direction the film traveled as it passed over idler rollers in the film production process, it also includes directions that deviate up to 44 degrees from the direction the film traveled as it passed over idler rollers in the production process.

As used herein, the phrase "transverse direction" refers to a direction perpendicular to the machine direction. Transverse direction is abbreviated as "TD". The transverse direction also includes directions that deviate up to 44 degrees from the direction the film traveled as it passed over idler rollers in the production process.

As used herein, the term "bag" refers to a packaging article having an open top, side edges, and a bottom edge. The term "bag" encompasses lay-flat bags, pouches, casings (seamless casings and backseamed casings, including lap-sealed casings, fin-sealed casings, and butt-sealed backseamed casings having backseaming tape thereon). Various casing configurations are disclosed in U.S. Pat. No. 6,764,729 B2, to Ramesh et al, entitled "Backseamed Casing and Packaged Product Incorporating Same, which is hereby incorporated in its entirety, by reference thereto.

The term "bag" also includes that portion of a package that is derived from a bag. That is, once a product is placed inside a bag, the bag is sealed closed so that it surrounds the product. Excess bag length (i.e., the "bag tail") can optionally be cut off along a line close to the seal made across the bag to enclose the product within the bag, and thereafter optionally the film can be shrunk around the product. The portion of the bag that remains and is configured around the product is herein also within the term "bag". The phrase "an opposite bag edge" refers to the edge of the bag that is directly across from the bag edge having the means for initiating tear. For example, a bag top edge is opposite the bag bottom edge; a first bag side edge is opposite the second bag side edge. As used herein, the phrase "a side of the bag" is used with reference to each of the first and second sides of a lay-flat bag, as well as each of the two principal, flat sides of a gusseted bag.

As used herein, the phrase "bag skirt" refers to that portion of a bag that is outward of a heat seal, i.e., the excess bag length or width on the non-product side of the heat seal. In an end-seal bag, the bag skirt is short in the machine direction and long in the transverse direction. In a side-seal bag, the bag skirt is long in the machine direction and short in the transverse direction. In either case, the "width" of the bag skirt is the shorter dimension of the skirt, and the "length" of the bag skirt is the longer dimension of the skirt. A bag skirt can have a width, before the film is shrunk, of at least 5 millimeters, or at least 10 millimeters, or at least 15 millimeters, or at least 20 millimeters, or at least 25 millimeters, or at least 30 millimeters. The bag skirt can have a width of from 5 to 100 millimeters, or from 10 to 50 millimeters, or from 15 to 40 millimeters, or from 20 to 35 millimeters.

As used herein, the phrase "lay-flat bag" refers generically to non-gusseted bags used for the packaging of a variety of products, particularly food products. More specifically, the phrase "lay-flat bag" includes side seal bag, end-seal bag, L-seal bag, U-seal bag (also referred to as a pouch), and backseamed bag (also referred to as T-seal bag). The backseam can be a fin seal, a lap seal, or a butt-seal with a backseaming tape. Before the bag is shrunk, it can have a length-to-width ratio of from 1:1 to 20:1; or from 1.5:1 to 8:1; or from 1.8:1 to 6:1; or from 2:1 to 4:1.

The means for initiating tear can be a cut in the bag skirt. As used herein, the term "cut" refers to the penetration through the film, or shearing through the film, with a shearing means or edged instrument. The term "cut" is inclusive of both slits and notches. As used herein, the term "slit" refers to a cut through the film without the separation and removal of a piece of film from the bag. A slit can be from the edge of the bag (i.e., an "edge slit") or internal, i.e., not extending to an edge (i.e., "internal slit" also referred to as a "slit hole"). The slit can be straight or curved or wavy.

The term "hole", as used herein, includes both an internal puncture (i.e., internal hole) or internal cut (i.e., an internal slit) through the packaging article, as well as an internal cut that removes a piece of film from the article. The hole can utilize a straight cut or a curved cut. The hole can be round or square or rectangular or irregular in shape.

A "notch" is formed by a cut that removes a piece of film along an otherwise straight or smooth curved edge of a bag skirt or a bag tail, producing a point for stress concentration during the subsequent manual application of tearing force. A notch can be V-shaped or round or square or rectangular or oval or of any regular or irregular profile.

The slit or notch or hole in the bag skirt can extend across at least 10 percent of the width of the bag skirt before the bag is shrunk; or at least 20 percent, or at least 30 percent or at least 40 percent, or at least 50 percent, or at least 60 percent, or at least 70 percent, or at least 80 percent, or at least 90 percent, of the width of the bag skirt or bag tail. The slit or notch or hole can angle inward, toward the bag center.

In end-seal and side-seal bags, a portion of a bag skirt is in a first lay-flat side of the bag, and a portion of the same bag skirt is in a second lay-flat side of the bag. The first lay-flat side of the bag skirt can have a first means for initiating tearing, and the second lay-flat side of the bag can have a second means for initiating tearing.

The first means for initiating tearing can overlap the second means for initiating tearing when the end-seal or side-seal bag (or any other bag) is in its lay-flat configuration, as well as in the shrunken package. Overlapping enhances the ease of simultaneously initiating and propagating the tears in the first and second sides of the bags. Moreover, the first means for initiating tearing can coincide (i.e., be positioned directly over and correspond with in length and shape) with the second means for initiating tearing when the bag is in its lay-flat configuration.

The bag can be provided with both a first means for initiating tearing that is overlapping or coincident with the second means for initiating tearing, with the bag further comprising a third means for initiating tearing and a fourth means for initiating tearing, the fourth means for initiating tearing being overlapping or coincident with the third means for initiating tearing. The first and second means for initiating tearing can be positioned in a bag skirt for making a manual tear in a machine direction, with the third and fourth means for initiating tearing being positioned for making a manual tear in a transverse direction. The third and fourth means for initiating tearing can be positioned in a bag skirt, or near the top edge of the bag so that they are positioned in the bag tail after the product is placed in the bag and the bag sealed closed so that it surrounds the product.

As used herein, the verb "to tear" refers to pulling an object apart by force. The noun "tear" refers to the resulting break in the object being torn. The tearing of the film results from placing the film under enough tension that it is pulled apart by the force. The pulling force is concentrated by the means for initiating tearing, which allows a smaller pulling force to pull the film apart, i.e., tear the film. The high impact strength heat-shrinkable films are not susceptible to being manually torn without the presence of the means for initiating tearing. In the heat-shrinkable bag, the high impact strength multilayer film undergoes tearing from the means for initiating tearing toward the opposite edge of the bag.

The phrase "means for initiating tearing", as used herein, refers to any one or more of a variety of means that can be located in the bag skirt (and/or in the bag tail). The means for initiating tearing allows manual tearing force to be concentrated on a point or small region of the film(s), so that tear initiation and tear propagation can be produced manually. A slit in the bag skirt, as illustrated in FIG. 6A, can serve as the means for initiating tearing. Alternatively, the means for initiating tearing can be a V-shaped notch in the bag skirt (see FIG. 6B) or a rounded notch in the bag skirt (see FIG. 6C), or a rectangular notch in the bag skirt (see FIG. 6D), or a slit hole in the bag skirt (see FIG. 6E) or a round hole in the bag skirt (see FIG. 6F), or a pointed oval hole in the bag skirt (see FIG. 6G), or a rectangular hole in the bag skirt (see FIG. 6H).

As used herein, the phrase "manual" and the term "manually" are both used with reference to tearing with the hands alone i.e., without the need for a knife, scissors, or any other implement to assist with initiating or propagating tearing of the film. The term "manual" is used with respect to tear initiation, i.e., the manual starting of the tearing action, as well as with respect to tear propagation, i.e., the manual continuation (i.e., extension) of a tear that has been manually initiated.

In addition to the means for initiating tear, the bag can be provided with means for gripping. The means for gripping can enhance the tearing of the shrunken bag. The means for gripping can be in one lay-flat side of the bag or in both lay-flat sides of the bag. The means for gripping can be a hole in the bag skirt (and/or in the bag tail), an extension of the bag skirt (and/or the bag tail), or a separate film tab fastened to the bag skirt (and/or the bag tail). The separate film tab can be made from a thermoplastic polymer, paper, or other material, and can be heat-shrinkable or non-heat-shrinkable. The multilayer, heat-shrinkable bag can be provided with the combination of a means for initiating tear and a means for enhancing gripping of the bag. For example, the bag skirt can have a slit as the means for initiating tear and a hole as the means for enhancing gripping. See FIG. 6I. The bag skirt can have a slit as the means for initiating tear and two holes providing the means for enhancing gripping. See FIG. 6J. Alternatively, the means for initiating gripping can be a tab, as illustrated in FIG. 6K, this figure further illustrating the tab being used in combination with a slit.

With respect to the tearing of the film from which the bag is made, as used herein the phrase "the tear is capable of being propagated . . ." refers to the manner in which the film tends to propagate the tear when the bag is subjected to an ordinary manual opening thereof, i.e., the bag being "gripped and ripped" in the ordinary course of opening. The bag tends to exhibit linear tear. Usually, the tear is substantially in line with the machine direction or substantially in line with the transverse direction.

If the tear is being made in the machine direction of the film, the tear may be within from 0 to 44 degrees of the actual machine direction of the film, i.e., so long as the tear can be propagated toward and to the opposite side edge of the bag; or the tear may be within from 0 to 20 degrees, or within from 0 to 15 degrees, or within from 1 to 20 degrees, or within from 0 to 10 degrees; or within from 0 to 5 degrees, or within from 0 to 2 degrees of the machine direction of the film. The same holds true of transverse direction tearing, i.e., the tear may be within from 0 to 44 degrees of the actual transverse direction of the film; or the tear may be within 0 to 20 degrees, or within 1 to 20 degrees, or within from 0 to 10 degrees; or within from 0 to 5 degrees, or within from 0 to 2 degrees of the transverse direction of the film.

As used herein, the phrase "readily removed" is applied to the removal of a product from a packaging article surrounding or substantially surrounding the product. As used herein, the phrase "readily removed" refers to the manual removal of the product from within the confines of the packaging article without any further substantial amount of tearing, and without any substantial further permanent deformation of the film. As used herein, the phrase "substantial tearing of the film" refers to tearing greater than or equal to 2 millimeters in length. As used herein, the phrase "substantial permanent deformation of the film" refers to a permanent stretching of the film greater than or equal to 2 millimeters at any location on the film.

As used herein, the phrases "seal layer," "sealing layer," "heat seal layer," and "sealant layer," refer to an outer film layer, or layers, involved in heat sealing the film to itself, another film layer of the same or another film, and/or another article which is not a film. Heat sealing can be performed in any one or more of a wide variety of manners, such as melt-bead sealing, thermal sealing, impulse sealing, ultrasonic sealing, hot air sealing, hot wire sealing, infrared radiation sealing, ultraviolet radiation sealing, electron beam sealing, etc.). A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling.

In some embodiments, the seal layer can comprise a polyolefin, particularly an ethylene/alpha-olefin copolymer. For example, the seal layer can contain a polyolefin having a density of from 0.88 g/cc to 0.917 g/cc, or from 0.90 g/cc to 0.917 g/cc. The polyolefin can be an ethylene/alpha-olefin copolymer. More particularly, the seal layer can comprise at least one member selected from the group consisting of very low density polyethylene and homogeneous ethylene/alpha-olefin copolymer. Very low density polyethylene is a species of heterogeneous ethylene/alpha-olefin copolymer. The heterogeneous ethylene/alpha-olefin (e.g., very low density polyethylene) can have a density of from 0.900 to 0.917 g/cm$^3$, and the homogeneous ethylene/alpha-olefin copolymer can have a density of from 0.880 g/cm$^3$ to 0.910 g/cm$^3$, or from 0.880 g/cm$^3$ to 0.917 g/cm$^3$. The polyolefin can be an ionomer resin or an ethylene/alpha-olefin copolymer. Metallocene-catalyzed sealants with densities of 0.917 g/cm$^3$ or less, as well as a very low density polyethylene having a density of 0.912 g/cm$^3$, provided excellent optics. Plastomer-type metallocene sealants with densities less than 0.910 g/cm$^3$ also provided excellent optics.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers can comprise, for example, at least one member selected from the group consisting of hydrolyzed ethylene/vinyl acetate copolymer (designated by the abbreviations "EVOH" and "HEVA", and also referred to as "saponified ethylene/vinyl acetate copolymer" and "ethylene/vinyl alcohol copolymer"), polyvinylidene chloride, amorphous polyamide, polyamide MXD6 (particularly MXD6/MXDI copolymer), polyester, polyacrylonitrile, etc., as known to those of skill in the art. In addition to the first and second layers, the heat-shrinkable film may further comprise at least one barrier layer.

The heat-shrinkable film can exhibit $O_2$-transmission rate of from 1 to 20 cc/m$^2$ day atm at 23° C. and 100% relative humidity, or from 2 to 15 cc/m$^2$ day atm at 23° C. and 100% relative humidity, or from 3 to 12 cc/m$^2$ day atm at 23° C. and 100% relative humidity, or from 4 to 10 cc/m$^2$ day atm at 23° C. and 100% relative humidity. Alternatively, the heat-shrinkable film can exhibit an $O_2$-transmission rate of from 21 cc/m$^2$ day atm to 15,000 cc/m$^2$ day atm, or from 500 cc/m$^2$ day atm to 10,000 cc/m$^2$ day atm, or from 2000 cc/m$^2$ day atm to 6,000 cc/m$^2$ day atm.

As used herein, the phrase "tie layer" refers to any internal layer having the primary purpose of adhering two layers to one another. Tie layers can comprise any polymer having a polar group grafted thereon. Such polymers adhere to both nonpolar polymers such as polyolefin, as well as polar polymers such as polyamide and ethylene/vinyl alcohol copolymer. Tie layers can comprise at least one member selected from the group consisting of polyolefin (particularly homogeneous ethylene/alpha-olefin copolymer), anhydride-modified polyolefin, ethylene/vinyl acetate copolymer, and anhydride-modified ethylene/vinyl acetate copolymer, ethylene/acrylic acid copolymer, and ethylene/methyl acrylate copolymer. Typical tie layer polymers comprise at least one member selected from the group consisting of anhydride modified linear low density polyethylene, anhydride modified low density polyethylene, anhydride modified polypropylene, anhydride modified methyl acrylate copolymer, anhydride modified butyl acrylate copolymer, homogeneous ethylene/alpha-olefin copolymer, and anhydride modified ethylene/vinyl acetate copolymer.

As used herein, the phrases "inner layer" and "internal layer" refer to any layer, of a multilayer film, having both of its principal surfaces directly adhered to another layer of the film.

As used herein, the phrase "outer layer" refers to any film layer having less than two of its principal surfaces directly adhered to another layer of the film. A multilayer film has two outer layers, each of which has a principal surface adhered to only one other layer of the multilayer film.

As used herein, the term "adhered" is inclusive of films which are directly adhered to one another using a heat seal or other means, as well as films which are adhered to one another using an adhesive which is between the two films. This term is also inclusive of layers of a multilayer film, which layers are of course adhered to one another without an adhesive therebetween. The various layers of a multilayer film can be "directly adhered" to one another (i.e., no layers therebetween) or "indirectly adhered" to one another (i.e., one or more layers therebetween).

As used herein, the term "package" refers to packaging materials configured around a product being packaged. As such, the term "package" includes both the packaging around the product, and the product itself, i.e., the combination of the packaging and the product(s) within the package.

Once a multilayer film is heat sealed to itself or another member of the package being produced (i.e., is converted into a packaging article, e.g., a bag, pouch, or casing), one outer layer of the film is an inside layer of the packaging article and the other outer layer becomes the outside layer of the packaging article. The inside layer can be referred to as an "inside heat seal/product contact layer", because this is the film layer that is sealed to itself or another article, and it is the film layer closest to the product, relative to the other layers of the film. The other outer layer can be referred to as the "outside layer" and/or as the "outer abuse layer" or "outer skin layer", as it is the film layer furthest from the product, relative to the other layers of the multilayer film. Likewise, the "outside surface" of a packaging article (i.e., bag) is the surface away from the product being packaged within the bag.

While the multilayer heat-shrinkable film can be sealed to itself to form an end-seal bag or other bag, optionally, a heat-shrinkable patch film can be adhered to the bag. The patch film can be heat-shrinkable, and can have a total free shrink at 185° F. of at least 35 percent, measured in accordance with ASTM D-2732. The bag film and the patch film can have a total free shrink at 185° F. that are within 50 percent of one another, or within 20 percent of one another, or with 10 percent of one another, or within 5 percent of one another, or within 2 percent of one another. The patch may or may not cover the heat seal. If the patch covers a heat seal, optionally the heat seal may be made through the patch. If the tear is to be made though the bag and through the patch, the patch should cover a heat seal, and the means for initiating tear should be through both the bag film and the patch film. The bag can have a curved seal and the patch can extend into and through the region of the curved seal and over and past the curved seal. If the bottom edge of the bag is curved, a bottom edge of the patch can also be curved. The patch bag can have any desired configuration of patch on bag as disclosed in any one or more of U.S. Pat. Nos. 4,755,403, 5,540,646, 5,545,419, 6,296,886, 6,383,537, 6,663,905, 6,790,468, each of which is hereby incorporated, in its entirety, by reference thereto.

End-seal bags with curved heat seals, and end-seal patch bags with curved heat seals, can be designed for have manual tear initiation and manual directional tear propagation. While the end-seal may be curved, the bottom edge of the bag may be straight across the tubing, or may also be curved. A curved bottom heat seal and a straight across bag bottom edge leaves room at the bottom corners of the bag for providing the means for tear initiation, and also for a means to facilitate gripping of the bag for the tearing operation. Patch bags with curved end seals are disclosed in U.S. Pat. No. 6,270,819, to Wiese, which is hereby incorporated, in its entirety, by reference thereto.

The term "polymer", as used herein, is inclusive of homopolymer, copolymer, terpolymer, etc. "Copolymer" includes copolymer, terpolymer, etc.

Blends of incompatible polymers in one or more film layers can enhance the tear initiation, tear propagation, and linear tear properties of the film, including the ability to manually tear down the full length or across the full width of a package made from a bag which in turn has been made from film, i.e., tearing through a seal and through and to the opposite edge of the bag used to make the package. For a package made from an end-seal bag, the tear can be initiated in the bag skirt, and the tear can be manually extended for up to the full length of the package, i.e., to that portion of the package that corresponds with the opposite edge of the bag after the bag is used to make the package. For a package made from a side-seal bag, the tear can be initiated in the bag skirt, and the tear can be manually extended across the full width of the package (i.e., corresponding with the full machine direction dimension of the bag) for up to the full width of the package, i.e., to that portion of the package that corresponds with the opposite edge of the side-seal bag after the bag is used to make the package.

As used herein, the phrase "incompatible polymers" refers to two polymers (i.e., a blend of at least two polymers) that are incapable of forming a solution or even a stable two-phase blend, and that tend to separate after being mixed. When blended, incompatible polymers are not miscible with one another, and phase separate into a continuous domain and a discontinuous domain that may be finely dispersed. The presence of one or more film layers comprising a blend of incompatible polymers may assist, enhance, or even cause the linear tear property of the multilayer heat-shrinkable film used to make the heat-shrinkable bag.

The blend of incompatible polymers can comprise at least one blend selected from the group consisting of:

(A) a blend of ethylene/alpha-olefin copolymer with ethylene/vinyl acetate copolymer (particularly EVA with at least 10 wt. % vinyl acetate, or at least 15 wt. % vinyl acetate, or at least 20 wt % vinyl acetate, or at least 25 wt. % vinyl acetate);

(B) a blend of ionomer resin with ethylene/vinyl acetate copolymer, and/or polybutylene, and/or polypropylene (particularly propylene copolymer);

(C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and/or antiblock;

(D) a blend of ethylene/vinyl acetate copolymer with polypropylene (particularly propylene/ethylene copolymer), and/or polybutylene, and/or modified ethylene/vinyl acetate copolymer, and/or polystyrene (particularly random and/or block styrene/butadiene copolymer);

(E) a blend of ethylene/norbornene copolymer with ethylene/vinyl acetate copolymer and/or polypropylene and/or polybutylene;

(F) a blend of ethylene/alpha-olefin copolymer with polypropylene (particularly propylene/ethylene copolymer) and/or polybutylene and/or ethylene/norbornene;

(G) a blend of single site catalyzed polypropylene (i.e., homogeneous polypropylene) with homogeneous ethylene/alpha-olefin copolymer and/or ethylene/vinyl acetate;

(H) a blend of polypropylene and/or ethylene/propylene copolymer and/or polybutylene with ethylene/methyl acrylate copolymer and/or ethylene/acrylic acid copolymer and/or ethylene/butyl acrylate copolymer; and (I) a blend of polyamide with polystyrene and/or ethylene/alpha-olefin copolymer and/or ethylene/vinyl acetate copolymer and/or styrene/butadiene copolymer (random and/or block copolymer).

Several specific blends of incompatible polymers that may be used include the following: (i) a blend of 50 weight percent cyclic olefin copolymer with 50 weight percent propylene homopolymer; (ii) a blend of 70 wt. percent polystyrene with 30 wt. percent ethylene/vinyl acetate copolymer having a vinyl acetate content of 9 percent or 15 percent; (iii) a blend of 70 wt. percent very low density polyethylene and 30 wt. percent cyclic olefin copolymer; (iv) a blend of 70 weight percent ethylene/propylene copolymer and 30 weight percent homogeneous ethylene/alpha-olefin copolymer; (v) a blend of 70 weight percent ethylene/propylene copolymer and 30 wt. percent ethylene/vinyl acetate copolymer having a vinyl acetate content of 9 percent or 15 percent; (vi) a blend of 70 weight percent ethylene/propylene copolymer and 30 weight percent ethylene/methyl acrylate copolymer; (vii) a blend of 70 weight percent polystyrene with 30 weight percent amorphous nylon; (viii) a blend of 70 weight percent ionomer resin with 30 weight percent ethylene/vinyl acetate copolymer having a vinyl acetate content of 4 percent; (ix) a blend of 70 weight percent polyamide with 30 weight percent low density polyethylene; (x) a blend of 65 weight percent amorphous polyamide with 35% styrene/butadiene/styrene block copolymer.

The tear initiation, tear propagation, and linear tear property of a multilayer heat-shrinkable film may also be enhanced by providing one or more layers of the film with a filler material, such as an inorganic filler. Polymeric systems that incorporate high filler concentrations may also enhance linear tear behavior. Depending on the particle size and dispersion, a filler concentration as low as 5 weight percent filler (i.e., based on total layer weight) in ethylene/alpha-olefin copolymer, polypropylene, propylene/ethylene copolymer, polybutylene, polystyrene/butadiene copolymer, ionomer resin, ethylene/vinyl acetate copolymer, ethylene/butyl acrylate copolymer, ethylene/methyl acrylate copolymer, ethylene/acrylic acid copolymer, polyester, polyamide, etc., may contribute to the linear tear behavior. More particularly, the presence of filler in an amount of from 5 to 95 weight percent, or in an amount of from 5 to 50 weight percent, or in an amount of from 10 to 40 weight percent, or from 20 to 35 weight percent, may be used.

Suitable fillers include silicates (particularly sodium silicate, potassium silicate, and aluminum silicate, alkali alumino silicate), silica (particularly amorphous silica), siloxane, silicone resin, zinc sulfide, wollastonite, microspheres, glass fiber, metal oxide (particularly oxides of titanium, zinc, antimony, magnesium, iron, and aluminum), calcium carbonate, sulfate (particularly barium sulfate and calcium sulfate), aluminum trihydrate, feldspar, perlite, gypsum, iron, fluoropolymer, crosslinked polymethylmethacrylate, talc, diatomaceous earth, zeolites, mica, kaolin, carbon black, and graphite.

The filler concentration required to achieve low tear initiation force is dependent on particle geometry, particle size, particle aspect ratio, and compatibility of the filler and the polymer matrix. Some fillers are chemically treated to improve the compatibility of the particle and the polymer into which it is dispersed.

The tear initiation, tear propagation, and linear tear property of a multilayer heat-shrinkable film may also be enhanced by providing one or more layers of the film with a polymer that provides the film with a relatively high Young's modulus, e.g., a polymer having a Young's modulus of at least 80,000 psi. Such polymers can comprise at least one member selected from the group consisting of high density polyethylene, ultra high molecular weight polyethylene, polypropylene (particularly propylene homopolymer), styrene copolymer (particularly styrene/butadiene block copolymer), ethylene/norbornene copolymer, semicrystalline polyamide, amorphous polyamide (including polyamide 6I/6T), polycarbonate, and polyester. The multilayer heat-shrinkable film may have a Young's Modulus of at least 80,000 psi. Young's modulus may be measured in accordance with one or more of the following ASTM procedures: D638, D882; D5026-95a; D4065-89, each of which is incorporated herein in its entirety by reference. The film may have a Young's modulus of at least about, and/or at most about, any of the following: 100,000; 130,000; 150,000; 200,000; 250,000; 300,000; 350,000; and 400,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

As used herein, terms such as "polyamide", "polyolefin", "polyester", etc are inclusive of homopolymers of the genus, copolymers of the genus, terpolymers of the genus, etc, as well as graft polymers of the genus and substituted polymers of the genus (e.g., polymers of the genus having substituent groups thereon).

As used herein, the phrase "propylene/ethylene copolymer" refers to a copolymer of propylene and ethylene wherein the propylene mer content is greater than the ethylene mer content. Propylene/ethylene copolymer is not a species of "ethylene/alpha-olefin copolymer".

The phrase "ethylene/alpha-olefin copolymer" is particularly directed to heterogeneous copolymers such as linear low density polyethylene (LLDPE), very low and ultra low density polyethylene (VLDPE and ULDPE), as well as homogeneous polymers such as metallocene catalyzed polymers such as EXACT® resins obtainable from the Exxon Chemical Company, and TAFMER® resins obtainable from the Mitsui Petrochemical Corporation. All these latter copolymers include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefins commonly known as LLDPE have a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY® resins, are also included as another type of homogeneous ethylene/alpha-olefin copolymer useful in the film and process described herein.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages.

Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are useful in various layers of the multilayer heat-shrinkable film. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous ethylene/alpha-olefin copolymer can have a Mw/Mn of ≤3.0.

As used herein, the term "polyamide" refers to a polymer having amide linkages, more specifically synthetic polyamides, either aliphatic or aromatic, either in semi-crystalline or amorphous form. It is intended to refer to both polyamides and co-polyamides. The polyamides can be selected from nylon compounds approved for use in producing articles intended for use in processing, handling, and packaging food, including homopolymers, copolymers and mixtures of the nylon materials described in 21 C.F.R. 177.1500 et seq., which is incorporated herein by reference. Exemplary of such polyamides include nylon homopolymers and copolymers such as those selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-laurallactam)), nylon 6,6/6 (poly(hexamethylene adipamide-co-caprolactam)), nylon 6/66 (poly(caprolactam-co-hexamethylene adipamide)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polyauryllactam), nylon MXD6, nylon MXDI, nylon 6I/6T, and copolymers or mixtures thereof. Unless otherwise indicated, the phrase "semi-crystalline polyamide" includes all polyamides that are not considered to be amorphous polyamides. All semi-crystalline polyamides have a determinable melting point.

The film is a heat-shrinkable film. The film can be produced by carrying out only monoaxial orientation, or by carrying out biaxial orientation. As used herein, the phrase "heat-shrinkable" is used with reference to films which exhibit a total free shrink (i.e., the sum of the free shrink in both the machine and transverse directions) of at least 10% at 185° F., as measured by ASTM D 2732, which is hereby incorporated, in its entirety, by reference thereto. All films exhibiting a total free shrink of less than 10% at 185° F. are herein designated as being non-heat-shrinkable. The heat-shrinkable film multilayer film can have a total free shrink at 185° F. of from 10 percent to 150 percent, or from 15 percent to 120 percent, or from 20 percent to 100 percent, or from 30 percent to 80 percent, or from 35 percent to 60 percent, as measured by ASTM D 2732.

Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

In one embodiment, the film does not comprise a crosslinked polymer network. In another embodiment, the film comprises a crosslinked polymer network. Optionally, the film can be irradiated to induce crosslinking of polymer, particularly polyolefin in the film. The film can be subjected to irradiation using an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16 to 166 kGy, more preferably about 30 to 90 kGy, and still more preferably, 30 to 50 kGy. Preferably, irradiation is carried out by an electron accelerator and the dosage level is determined by standard dosimetry processes. Other accelerators such as a van der Graaf or resonating transformer may be used. The radiation is not limited to electrons from an accelerator since any ionizing radiation may be used.

The heat-shrinkable, multilayer film used to make the end-seal bag can be fully coextruded, or prepared using an extrusion-coating process. Optionally, an annular extrudate (herein also referred to as a "tape") can be irradiated before the additional layers are extrusion coated onto the substrate tape. Irradiation produces a stronger polymer network by crosslinking the polymer chains. Extrusion-coating allows a portion of the final multilayer structure to be crosslinked by irradiation (and thereby strengthened), in combination with avoiding irradiation of, for example, a layer of polyvinylidene chloride applied to the substrate via extrusion coating. Irradiation of polyvinylidene chloride is undesirable because irradiation can cause degradation of polyvinylidene chloride. Extrusion coating and irradiation are disclosed in U.S. Pat. No. 4,278,738, to Brax et al, which is hereby incorporated, in its entirety, by reference thereto.

In the multilayer, heat-shrinkable film, all of the film layers can be arranged symmetrically with respect to the polymeric composition of each film layer. In addition, all of the film layers can be arranged symmetrically with respect to both composition and thickness. In one embodiment, the seal layer is thicker than the second outer layer. The seal layer can have a thickness of from 110% to 300% of the thickness of the second outer layer, or from 150% to 250% of the thickness of the second outer layer.

One heat-shrinkable multilayer film from which the bag can be made comprises seven layers in the order: 1/2/3/4/5/6/7. The first layer is an outer food-contact layer and seal layer, and comprises homogeneous ethylene/alpha-olefin copolymer. The second layer comprising ethylene/methyl acrylate copolymer. The third layer comprises a blend of polyamide 6 with polyamide 6I, 6T. The fourth layer comprises EVOH. The fifth layer comprises a blend of polyamide 6 with polyamide 6I, 6T. The sixth layer comprises ethylene/methyl acrylate copolymer. The seventh layer comprises a blend of low density polyethylene and linear low density polyethylene. See Example 16, below.

Another heat-shrinkable multilayer film from which the bag can be made comprises three layers in the order: 1/2/3. The first layer is an outer food-contact layer that also serves as a seal layer. The first layer comprises a blend of ethylene/vinyl acetate copolymer, linear low density polyethylene, and homogeneous ethylene/alpha-olefin copolymer. The second layer comprising polyvinylidene chloride. The third layer comprises a blend of ethylene/vinyl acetate copolymer, linear low density polyethylene, and homogeneous ethylene/alpha-olefin copolymer. See Example 12, below.

Another heat-shrinkable multilayer film from which the bag can be made comprises seven layers in the order: 1/2/3/4/5/6/7. The first layer that is an outer food-contact layer and that also serves as a seal layer. The first layer comprises a blend of homogeneous ethylene/alpha-olefin copolymer and linear low density polyethylene. The second layer comprises a blend of heterogeneous ethylene/alpha-olefin copolymer and ethylene/vinyl acetate copolymer. The third layer comprises ethylene/vinyl acetate copolymer. The fourth layer comprises polyvinylidene chloride. The fifth layer comprises ethylene/vinyl acetate copolymer. The sixth layer comprises a blend of heterogeneous ethylene/alpha-olefin copolymer and ethylene/vinyl acetate copolymer. The seventh layer comprises a blend of homogeneous ethylene/alpha-olefin copolymer and linear low density polyethylene. See Examples 1 and 2, below.

Figure 2:
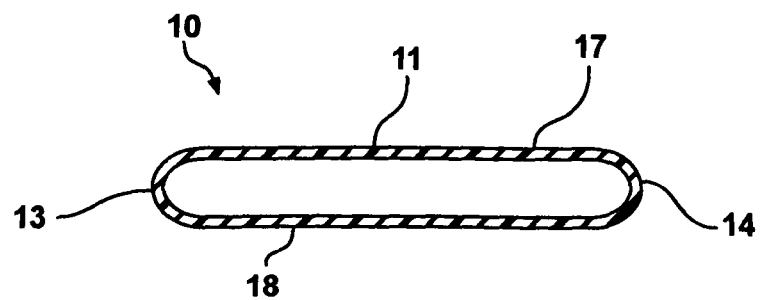
FIG. 2 is a transverse cross-sectional view of the heat-shrinkable, end-seal bag of FIG. 1.

FIGS. 1A and 2 together illustrate a schematic of end-seal bag 10, in a lay-flat position. End-seal bag 10 can be made from a seamless film tubing. FIG. 2 is a transverse cross-sectional view of end-seal bag 10 of FIG. 1A, taken through section 2-2 of FIG. 1A. Viewing FIGS. 1A and 2 together, end-seal bag 10 comprises heat-shrinkable bag film 11, bag top edge 12 defining an open top, folded first side edge 13, folded second side edge 14, bottom edge 15, and end seal 16. End-seal bag 10 further has first lay-flat side 17, second lay-flat side 18, and bag skirt 19. Bag skirt 19 is outward of end seal 16 (i.e., "outward" in that bag skirt 19 is further from the center of end-seal bag 10, and exterior of the product-containing cavity within end-seal bag 10). Bag skirt 19 includes a portion of first lay-flat side 17 and a portion of second lay-flat side 18. Bag skirt 19 further comprises first tear initiation means 20 in first lay-flat side 17, and second tear-initiation means 21 (illustrated by a dashed line because it is underneath first lay-flat side 17) in second lay-flat side 18.

Figure 1B:
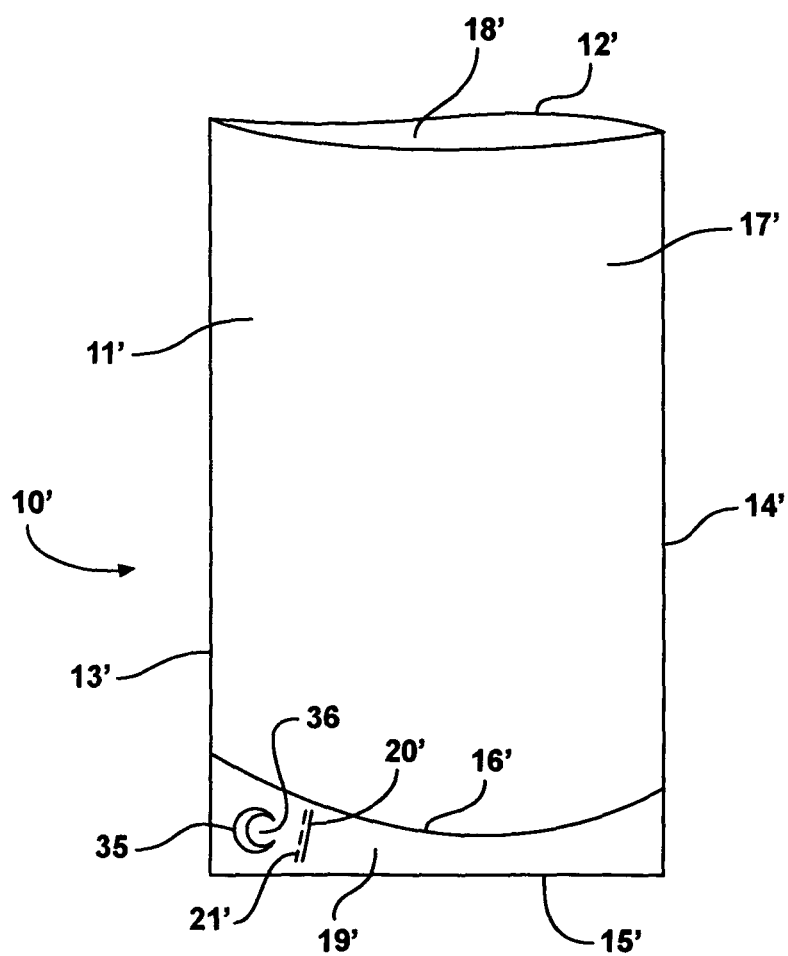
FIG. 1B is a schematic of a second heat-shrinkable, end-seal bag in lay-flat configuration.

FIG. 1B illustrates a schematic of an alternative end-seal bag 10', in a lay-flat position. End-seal bag 10' can be made from a seamless film tubing. End-seal bag 10' comprises heat-shrinkable bag film 11', bag top edge 12' defining an open top, folded first side edge 13', folded second side edge 14', bottom edge 15', and curved end seal 16'. End-seal bag 10' further has first lay-flat side 17', second lay-flat side 18', and bag skirt 19'. Bag skirt 19' is outward of curved end seal 16'. Bag skirt 19' comprises first tear initiation means 20' in first lay-flat side 17', and second tear-initiation means 21' (illustrated by a dashed line because it is underneath first lay-flat side 17') in second lay-flat side 18'. Both first tear-initiation means 20' and second tear initiation means 21' are slits though the bag that do not extend to either curved end seal 16' or bag bottom edge 15'. End seal bag 10' also has grip assist hole 35 in first lay-flat side 17' and second grip assist hole (not illustrated) in second lay-flat side 18'. These grip-assist holes facilitate gripping the bag for the manual tear initiation and manual tear propagation.

Grip assist holes can be sized to allow a user's finger(s) to be inserted therethrough to assist in gripping the film. Grip assist holes work in conjunction with the means for tear initiation, by providing a secure manual grip of the bag in a location designed to assist in generating tear initiation force along a tear line emanating from the means for tear initiation.

The grip assist hole in a first lay-flat side of the bag can overlap or coincide with the grip assist hole in a second lay-flat side of the bag. While grip assist holes can have any desired shape (e.g., round, rectangular, square, triangular, pentagonal, hexagonal, etc.), preferably the holes are round, or any "corners" on the holes are rounded, to reduce the presence of stress concentration points that could cause a tear to initiate from the grip assist hole, as an objective is to have the tear initiated from the means for initiating tearing, with the tear running to an opposite side edge of the bag.

In one embodiment, the grip-assist holes can be made by cutting through both lay-flat sides of the bag to remove a piece of film to form the holes. However, this process is more difficult to carry out, and it produces small, loose pieces of film corresponding with the size of the cut hole. These pieces of film may lodge inside the bag and thereafter adhere to a food product placed in the bag, which of course is an undesirable result. In order to prevent the production of a small, loose pieces of film, a cut can be made in the film in a shape that corresponds with a "partial hole cut", i.e., a cut through the film to make a portion of the hole, the cut not being complete so that a hole is formed. Such a cut leaves a "hanging chad" so that no separated small pieces of film are produced by the cut.

Figure 1C:
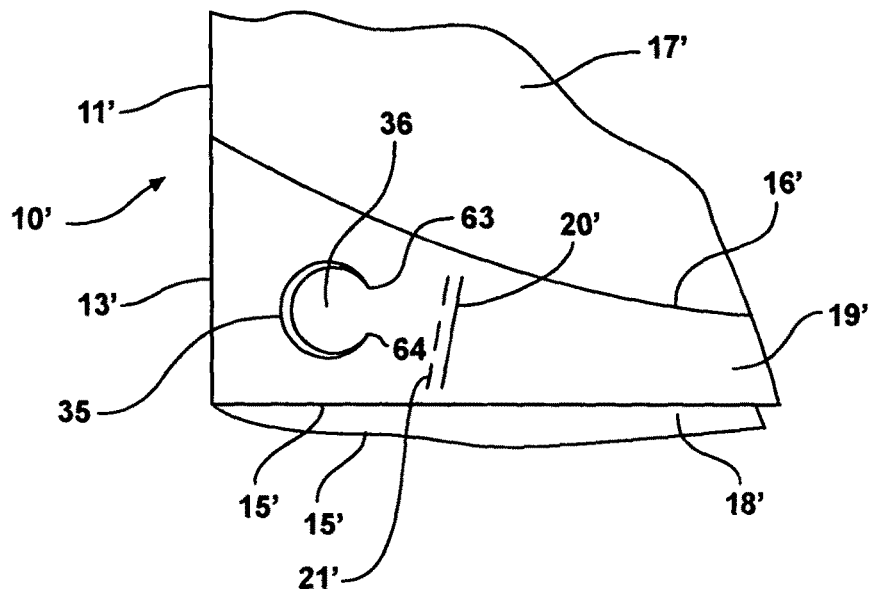
FIG. 1C is an enlarged, detailed view of a portion of the bag of FIG. 1B.
Figure 1D:
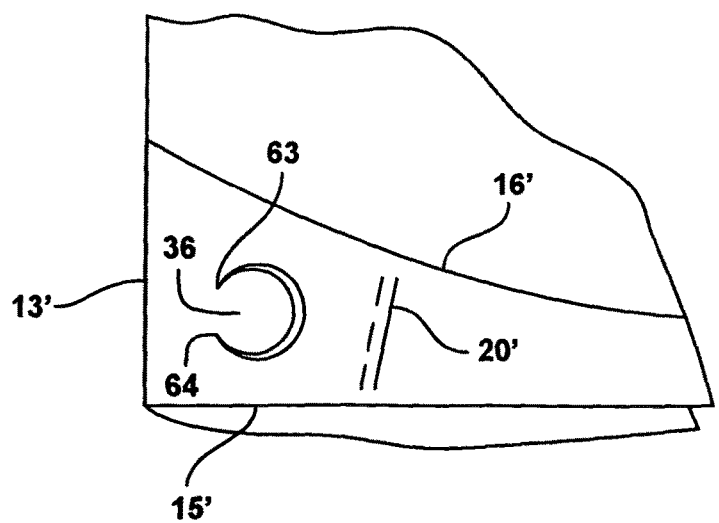
FIG. 1D is an enlarged, detailed view of a first less desirable embodiment of a bag otherwise corresponding with the bag of FIG. 1B.
Figure 1E:
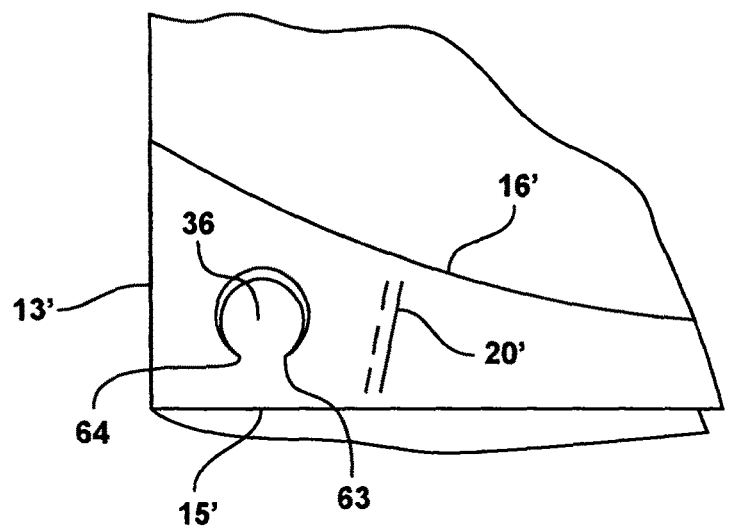
FIG. 1E is an enlarged, detailed view of a second less desirable embodiment of a bag otherwise corresponding with the bag of FIG. 1B.
Figure 1F:
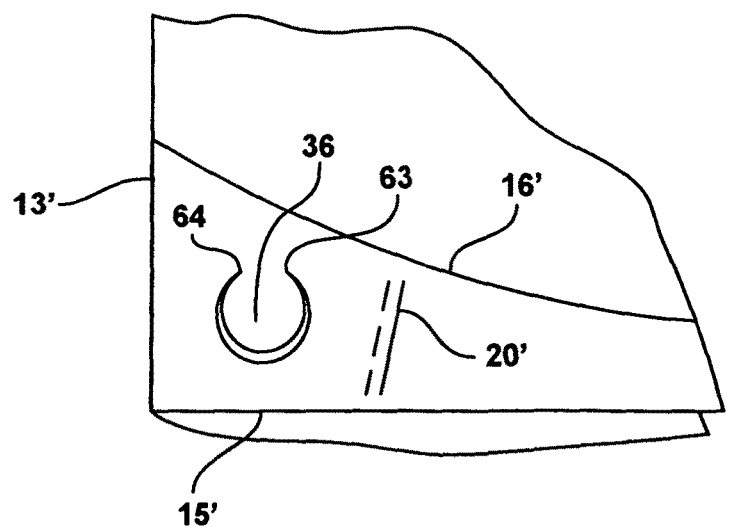
FIG. 1F is an enlarged, detailed view of a third less desirable embodiment of a bag otherwise corresponding with the bag of FIG. 1B.

FIG. 1B and FIG. 1C each illustrate hanging chad 36 formed by the partial hole cut made in bag 10'. As illustrated in FIG. 1C, hanging chad 36 is formed by a cut having endpoints 63 and 64. It has been found that leaving hanging chad 36 connected to film 11' by a the film connecting cut endpoints 63 and 64 results in a tear emanating from tear initiation cuts 20' and 21', with the tear running through seal 16' and through the length of bag 11'. On the other hand, if a hanging chad is formed by a cut as illustrated in FIG. 1D, or FIG. 1E, or FIG. 1F, use of the partial hole cut as a grip-assist means results in a tear that likely will not emanate from tear initiation cuts 20' and 21', but rather is likely to initiate a tear from the partial hole cut towards side edge 13' or towards bottom edge 15', as illustrated by the dashed lines in each of FIGS. 1D, 1E, and 1F.

Hanging chad 36 can be made so that it is connected to film 11' at a region oriented towards tear initiation cuts 20' and 21', as illustrated in FIG. 1B and FIG. 1C. The cut that forms hanging chad 36 can have endpoints that, if connected by a line, provide a line that is parallel to side edge 13' and/or parallel to tear initiation cuts 20' and 21', or by a line within plus or minus 30 degrees of being parallel to side edge 13' and/or tear initiation cuts 20' and 21', or by a line within plus or minus 25 degrees of being parallel to side edge 13' and/or tear initiation cuts 20' and 21', or by a line within plus or minus 20 degrees of being parallel to side edge 13' and/or tear initiation cuts 20' and 21', or by a line within plus or minus 15 degrees of being parallel to side edge 13' and/or tear initiation cuts 20' and 21', or by a line within plus or minus 10 degrees of being parallel to side edge 13' and/or tear initiation cuts 20' and 21', or by a line within plus or minus 5 degrees of being parallel to side edge 13' and/or tear initiation cuts 20' and 21', or by a line within plus or minus 3 degrees of being parallel to side edge 13' and/or tear initiation cuts 20' and 21', or by a line within plus or minus 2 degrees of side edge 13' and/or tear initiation cuts 20' and 21'.

FIGS. 3 and 4 together illustrate a schematic of side-seal bag 22, in a lay-flat position. Side-seal bag 22 can be made from a seamless film tubing. FIG. 4 is a transverse cross-sectional view of side-seal bag 22 of FIG. 3, taken through section 4-4 of FIG. 3. Side-seal bag 22 comprises heat-shrinkable bag film 23, top edge 24 defining an open top, folded bottom edge 25, first side seal 26, and second side seal 27. Side-seal bag 22 has first lay-flat side 28, second lay-flat side 29, first bag skirt 30, and second skirt 31. First bag skirt 30 is outward of first side seal 26 and second bag skirt 31 is outward of second side seal 27. First bag skirt 30 includes a portion of first lay-flat side 28 and a portion of second lay-flat side 29. First bag skirt 30 further comprises first tear initiation means 31 in first lay-flat side 28, and second tear-initiation means 33 (illustrated by a dashed line because it is underneath first lay-flat side 28) in second lay-flat side 29.

Figure 5:
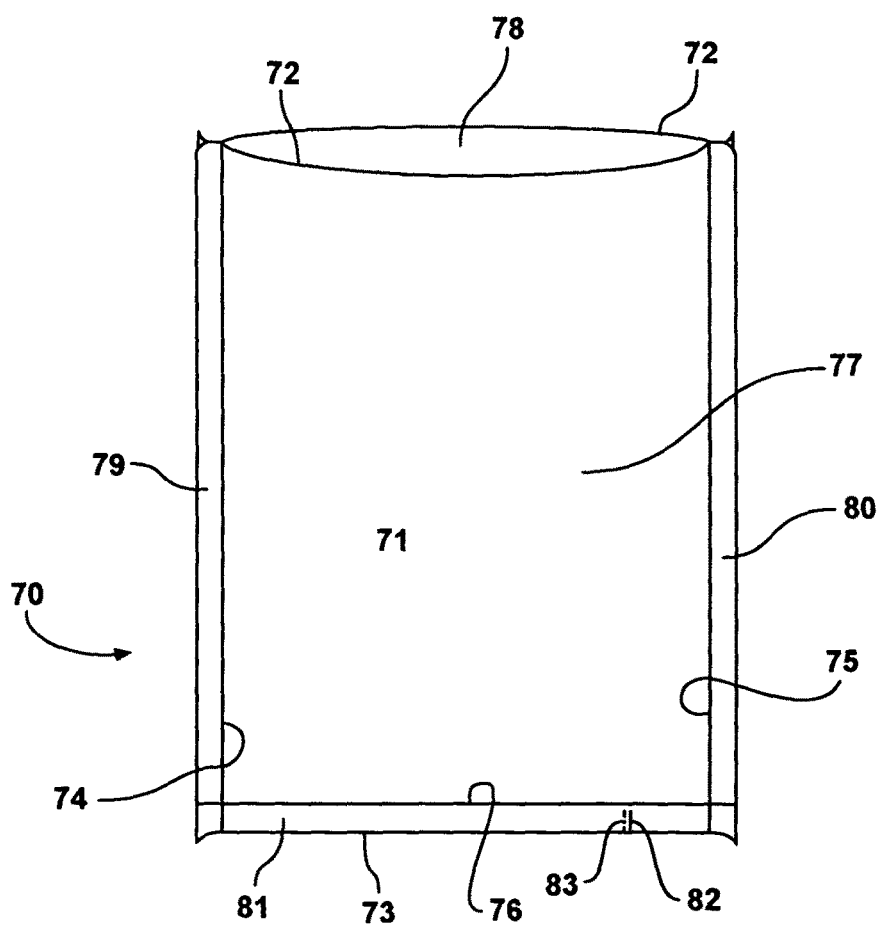
FIG. 5 is a schematic of a second heat-shrinkable, side-seal bag in lay-flat configuration.

FIG. 5 illustrates a schematic of alternate side-seal bag 70, also in lay-flat position. Alternate side-seal bag 70 can be made from a seamless film tubing. Alternate side-seal bag 70 comprises heat-shrinkable bag film 71, top edge 72 defining an open top, folded bottom edge 73, first side seal 74, second side seal 75, and bottom seal 76. Alternate side-seal bag 70 has first lay-flat side 77, second lay-flat side 78, first bag skirt 79, second bag skirt 80, and third bag skirt 81. First bag skirt 79 is outward of first side seal 74. Second bag skirt 80 is outward of second side seal 75. Third bag skirt 81 is outward of bottom seal 76. Third bag skirt 81 includes a portion of first lay-flat side 77 and a portion of second lay-flat side 78. Third bag skirt 81 further comprises first tear initiation means 82 in first lay-flat side 77, and second tear-initiation means 83 (illustrated by a dashed line because it is underneath first lay-flat side 77) in second lay-flat side 78.

FIGS. 6A through 6L illustrate enlarged cutaway portions of various embodiments of for a heat-shrinkable end-seal bag such as the bag illustrated in FIG. 1 and FIG. 2.

In FIG. 6A, bag 10A has end seal 16A and bag skirt 19A in first and second lay-flat sides of bag 10A. First lay-flat side 17A of bag 10A has slit 20A, and second lay-flat side 18A of bag 10A has coinciding slit 21A.

Figure 6C:
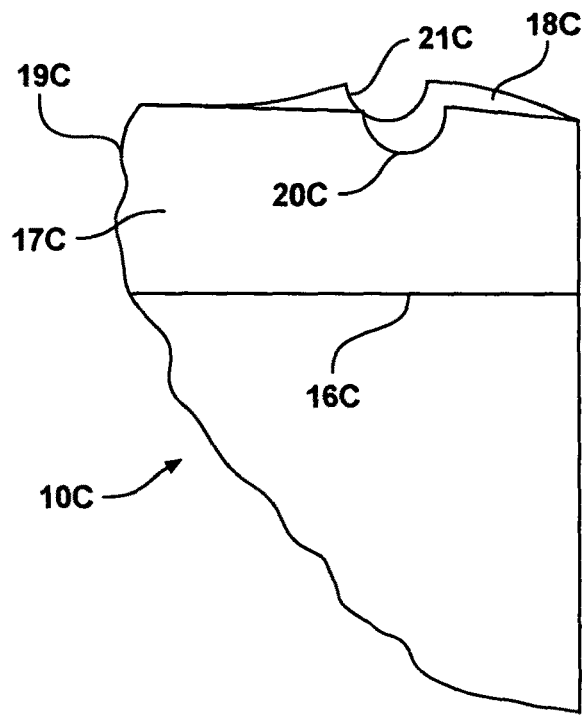
FIG. 6C is an enlarged detailed view of an alternative tear initiation feature to be used on another alternative heat-shrinkable, end-seal bag.
Figure 6D:
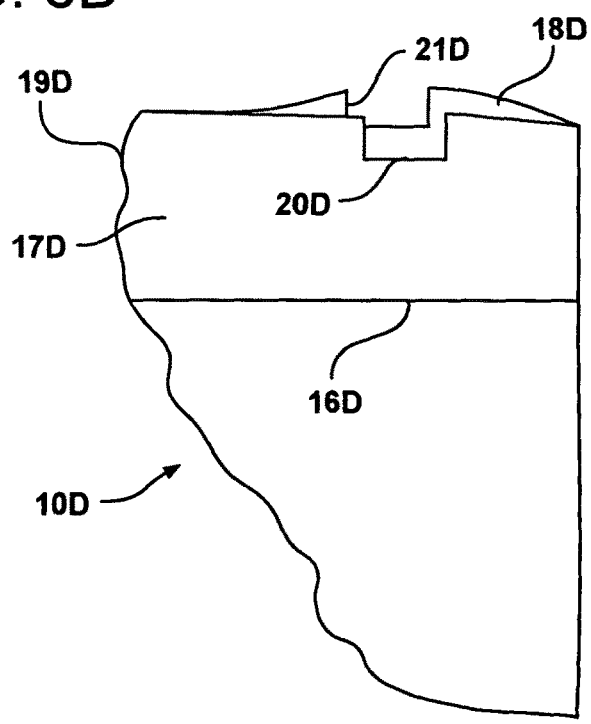
FIG. 6D is an enlarged detailed view of an alternative tear initiation feature to be used on another alternative heat-shrinkable, end-seal bag.
Figure 6E:
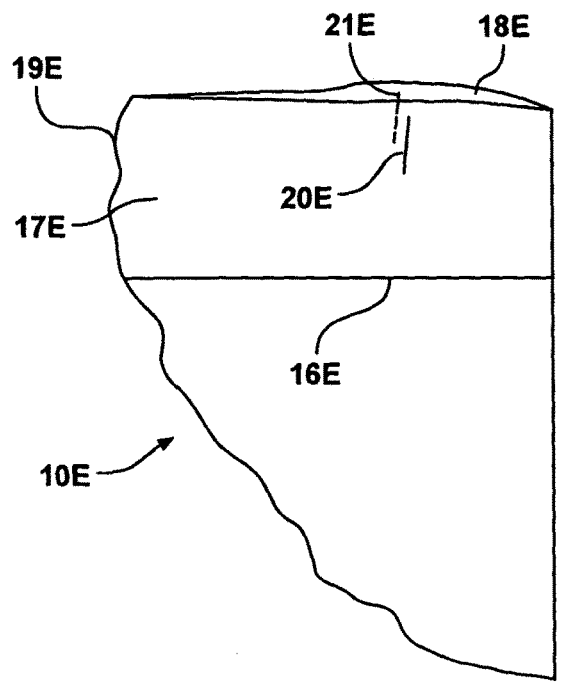
FIG. 6E is an enlarged detailed view of an alternative tear initiation feature to be used on another alternative heat-shrinkable, end-seal bag.
Figure 6F:
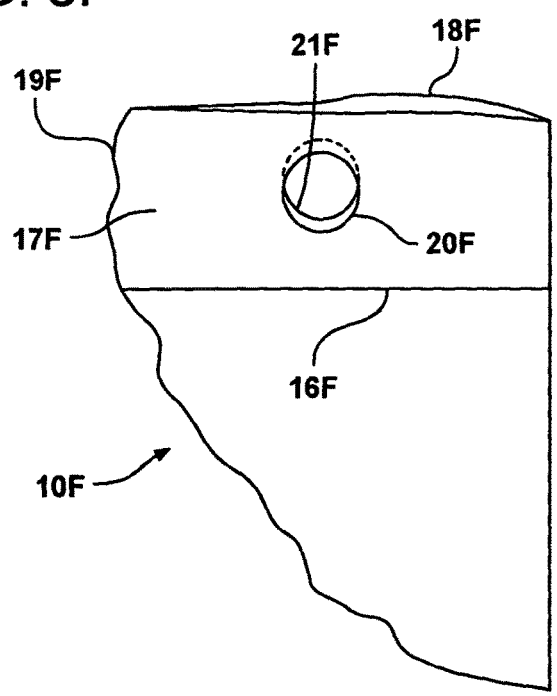
FIG. 6F is an enlarged detailed view of an alternative tear initiation feature to be used on another alternative heat-shrinkable, end-seal bag.
Figure 6G:
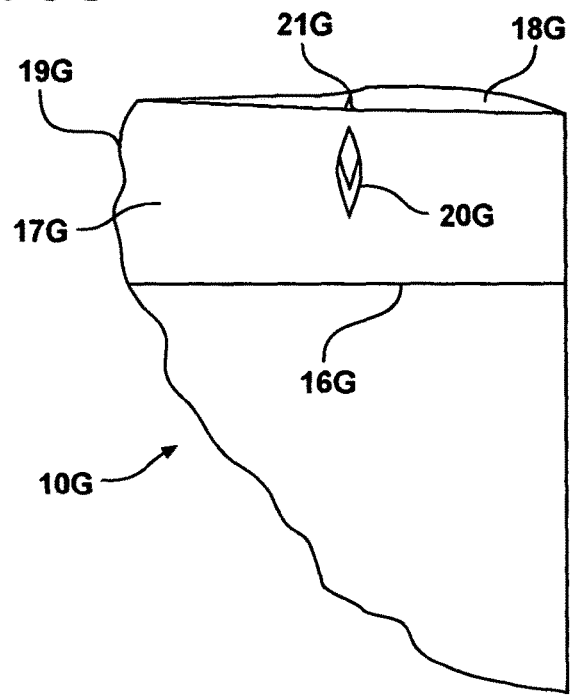
FIG. 6G is an enlarged detailed view of an alternative tear initiation feature to be used on another alternative heat-shrinkable, end-seal bag.
Figure 6H:
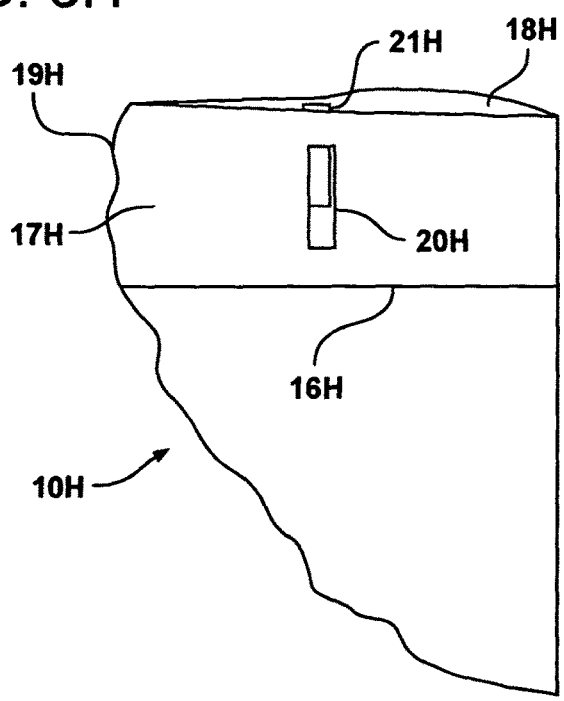
FIG. 6H is an enlarged detailed view of an alternative tear initiation feature to be used on another alternative heat-shrinkable, end-seal bag.
Figure 6I:
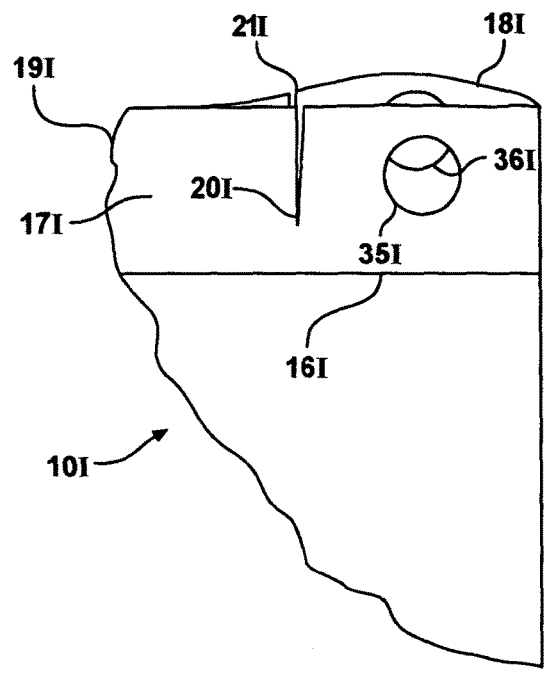
FIG. 6I is an enlarged detailed view of the tear initiation feature of the bag of FIG. 1, with the further addition of a means for manual grip-enhancement.
Figure 6J:
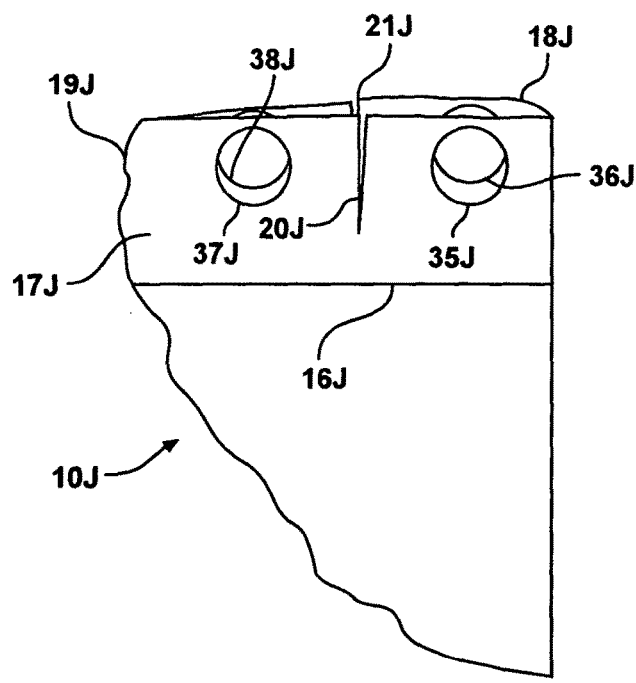
FIG. 6J is an enlarged detailed view of the tear initiation feature of the bag of FIG. 1, with the further addition of another means for manual grip enhancement.
Figure 6K:
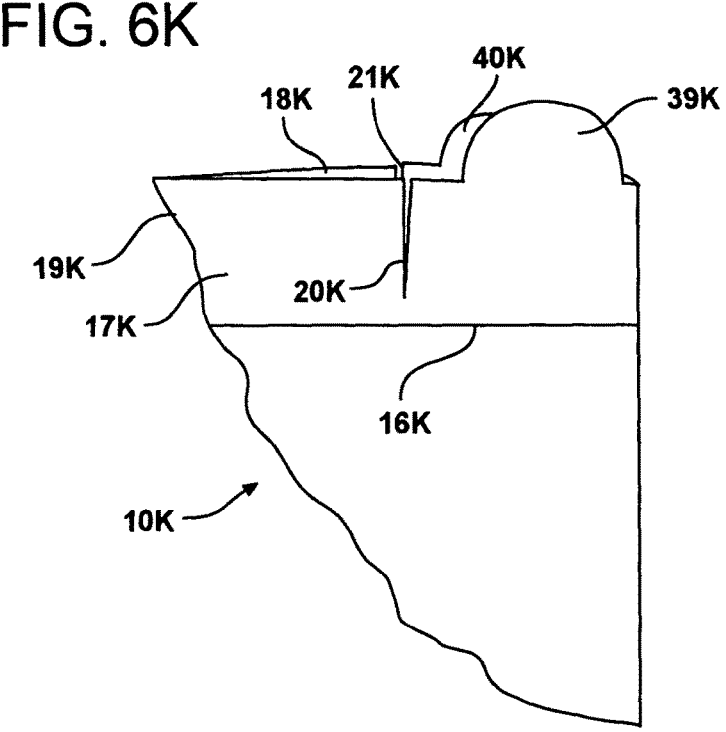
FIG. 6K is an enlarged detailed view of the tear initiation feature of the bag of FIG. 1, with the further addition of another means for manual grip enhancement.
Figure 6L:
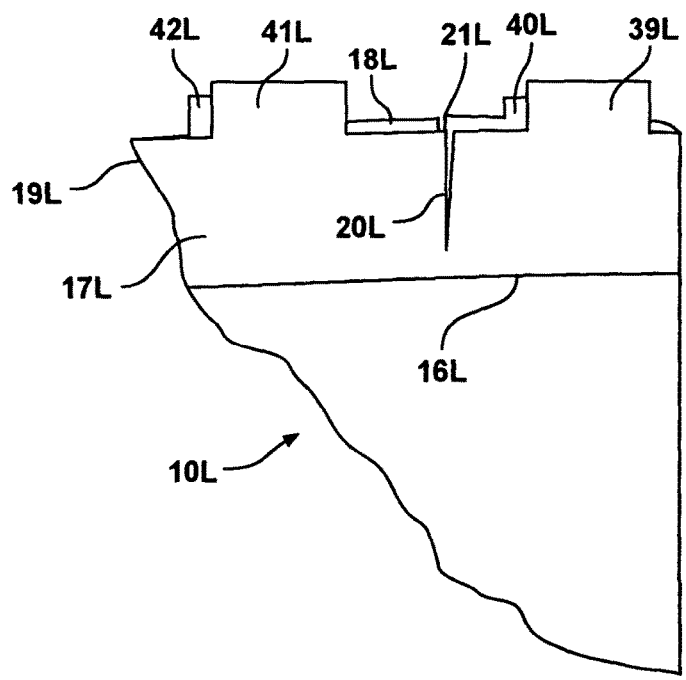
FIG. 6L is an enlarged detailed view of the tear initiation feature of the bag of FIG. 1, with the further addition of another means for manual grip enhancement.
Figure 6M:
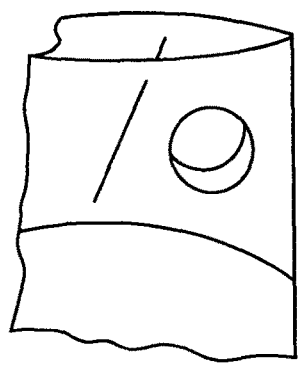
Figure 6N:
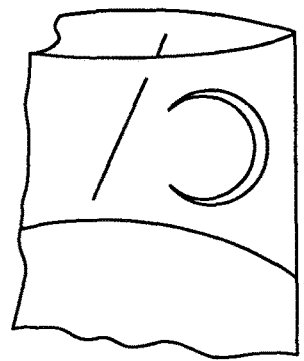
Figure 6O:
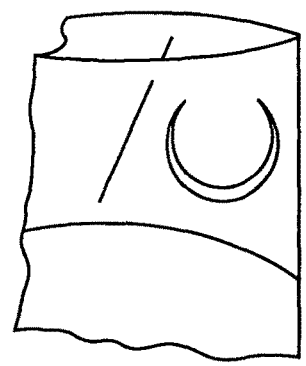
Figure 6P:
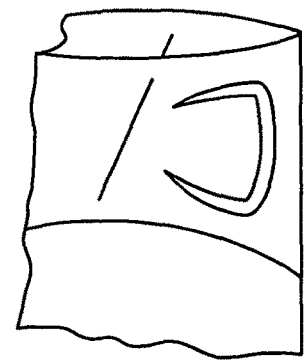
Figure 6Q:
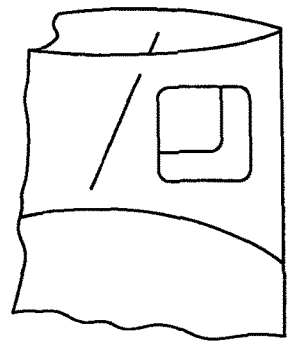
Figure 6R:
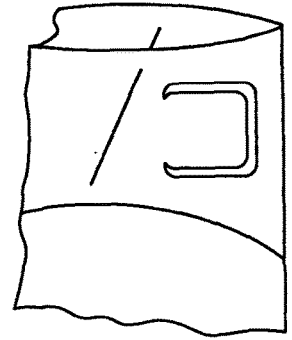
Figure 6S:
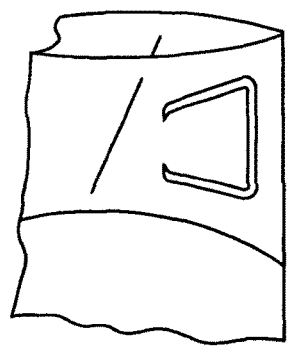
Figure 6T:
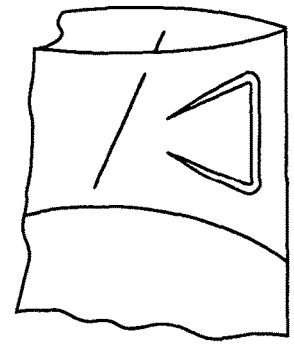
Figure 6U:
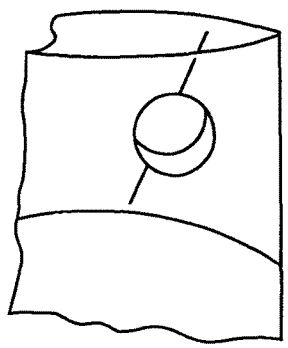
Figure 6V:
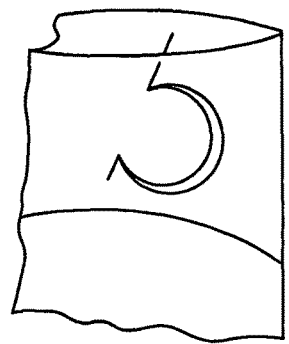
Figure 6W:
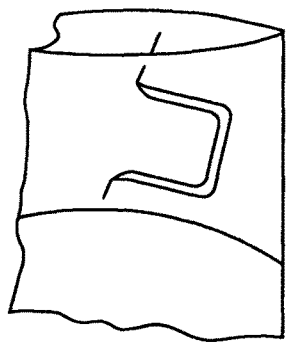
Figure 6X:
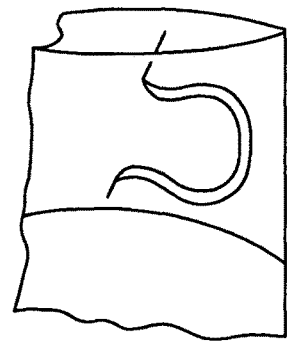
Figure 6Y:
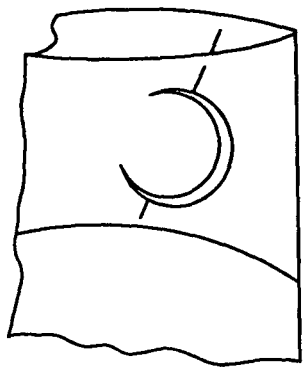
Figure 6Z:
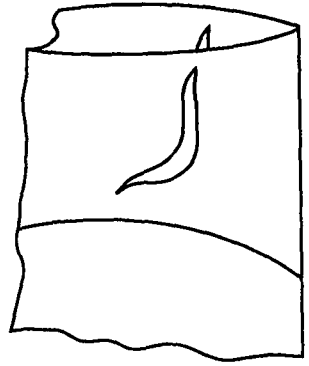
Figure 6A:
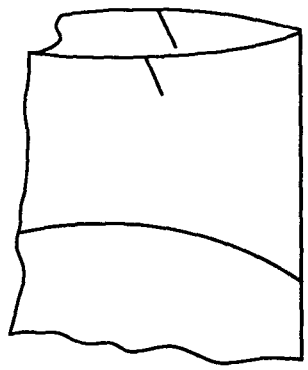
FIG. 6A is an enlarged detailed view of the tear initiation feature of the heat-shrinkable, end-seal bag of FIG. 1.
Figure 6B:
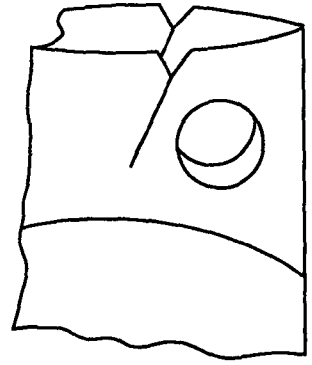
FIG. 6B is an enlarged detailed view of an alternative tear initiation feature to be used on an alternative heat-shrinkable, end-seal bag.
Figure 6C:
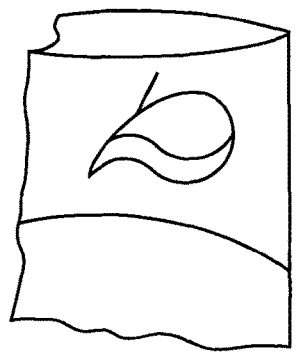
Figure 6D:
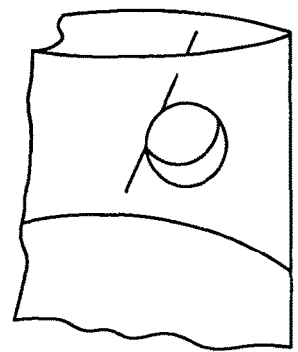
Figure 6E:
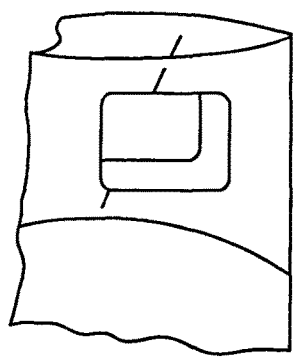
Figure 6F:
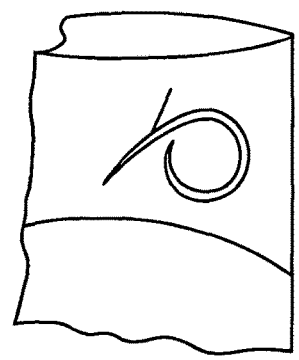

In FIG. 6B, bag 10B has end seal 16B and bag skirt 19B in first and second lay-flat sides of bag 10B. First lay-flat side 17B of bag 10B has V-notch 20B, and second lay-flat side 18B of bag 10B has coinciding V-notch 21B.

In FIG. 6C, bag 10C has end seal 16C and bag skirt 19C in first and second lay-flat sides of bag 10C. First lay-flat side 17C of bag 10C has round notch 20C, and second lay-flat side 18C of bag 10C has coinciding round notch 21C.

In FIG. 6D, bag 10D has end seal 16D and bag skirt 19D in first and second lay-flat sides of bag 10D. First lay-flat side 17D of bag 10D has rectangular notch 20D, and second lay-flat side 18D of bag 10D has coinciding rectangular notch 21D.

In FIG. 6E, bag 10E has end seal 16E and bag skirt 19E in first and second lay-flat sides of bag 10E. First lay-flat side 17E of bag 10E has slit hole 20E, and second lay-flat side 18E of bag 10E has coinciding slit hole 21E.

In FIG. 6F, bag 10F has end seal 16F and bag skirt 19F in first and second lay-flat sides of bag 10F. First lay-flat side 17F of bag 10F has round hole 20F, and second lay-flat side 18F of bag 10F has coinciding round hole 21F.

In FIG. 6G, bag 10G has end seal 16G and bag skirt 19G in first and second lay-flat sides of bag 10G. First lay-flat side 17G of bag 10G has pointed oval hole 20G, and second lay-flat side 18G of bag 10G has coinciding pointed oval hole 21G.

In FIG. 6H, bag 10H has end seal 16H and bag skirt 19H in first and second lay-flat sides of bag 10H. First lay-flat side 17H of bag 10H has rectangular hole 20H, and second lay-flat side 18H of bag 10H has coinciding rectangular hole 21H.

In FIG. 6I, bag 10I has end seal 16I and bag skirt 19I in first and second lay-flat sides of bag 10I. First lay-flat side 17I of bag 10I has slit 20I and grip-assist hole 35I, and second lay-flat side 18I of bag 10I has coinciding slit 21I and coinciding grip-assist hole 36I.

In FIG. 6J, bag 10J has end seal 16J and bag skirt 19J in first and second lay-flat sides of bag 10J. First lay-flat side 17J of bag 10J has slit 20J and grip-assist holes 35J and 37J, and second lay-flat side 18J of bag 10J has coinciding slit 21J and coinciding grip-assist holes 36J and 38J.

In FIG. 6K, bag 10K has end seal 16K and bag skirt 19K in first and second lay-flat sides of bag 10K. First lay-flat side 17K of bag 10K has slit 20K and grip-assist tab 39K, and second lay-flat side 18K of bag 10K has coinciding slit 21K and coinciding grip-assist tab 40K.

In FIG. 6L, bag 10L has end seal 16L and bag skirt 19L in first and second lay-flat sides of bag 10L. First lay-flat side 17L of bag 10L has slit 20L and grip-assist tabs 39L and 41L, and second lay-flat side 18L of bag 10L has coinciding slit 21L and coinciding grip-assist tabs 40L and 42L.

FIGS. 6M, 6N, 6O, 6P, 6Q, 6R, 6S, 6T, 6U, 6V, 6W, 6X, 6Y, 6Z, 6AA, 6BB, 6CC, 6DD, 6EE, and 6FF are enlarged detailed views of various alternative embodiments including means for initiating tear, with most of these embodiments further including means for assisting grip. The means for assisting grip is illustrated as a chadless-hole in FIGS. 6M, 6Q, 6U, 6BB, 6CC, and 6DD. The means for assisting grip is illustrated as a hole with hanging chad in FIGS. 6N, 6O, 6P, 6R, 6S, 6T, 6V, 6W, 6X, 6Y, and 6FF.

It has been found that tear initiation can be generated with less force if the means for initiating tear is a slit angled relative to the bag side edge, i.e., into the bag, as illustrated in, for example FIG. 6M. The slit can be angled from 1 to 45 degrees off of the machine direction, or angled from 3 to 30 degrees, or angled from 5 to 25 degrees, or angled from 10 to 20 degrees, or angled about 15 degrees.

A plurality of the heat-shrinkable end-seal bags of can be supplied individually in a container, or as a set of individual bags in shingled relationship on one or more tapes in accordance with U.S. Pat. No. 4,113,139, hereby incorporated, in its entirety, by reference thereto.

Figure 7A:
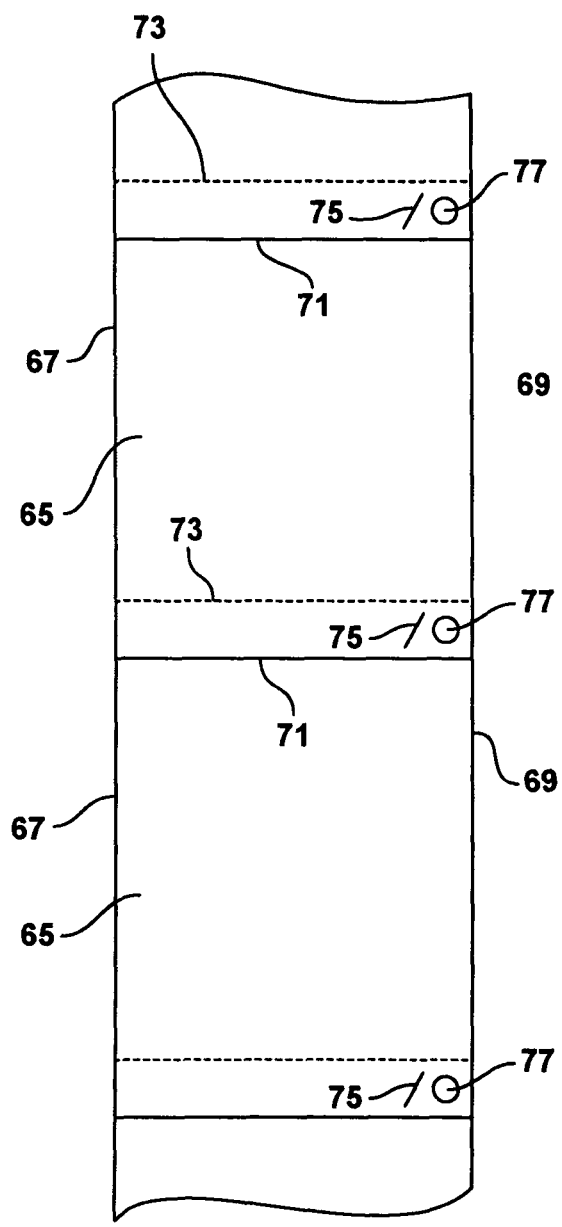
FIG. 7A is a schematic view of a first embodiment of a continuous strand of bags connected by a serration line.
Figure 7B:
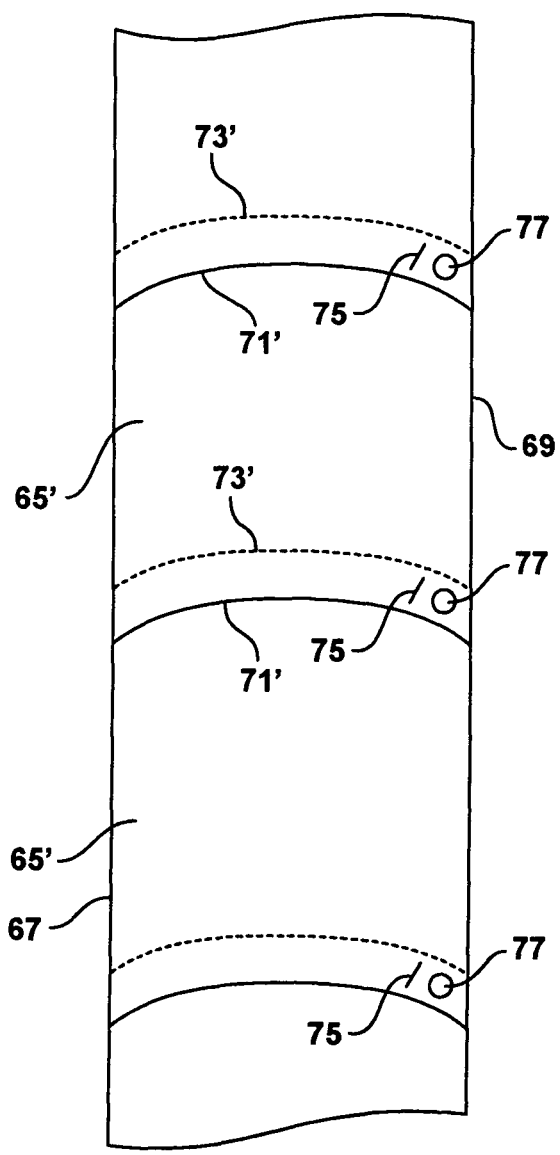
FIG. 7B is a schematic view of a second embodiment of a continuous strand of bags connected by a serration line.
Figure 7C:
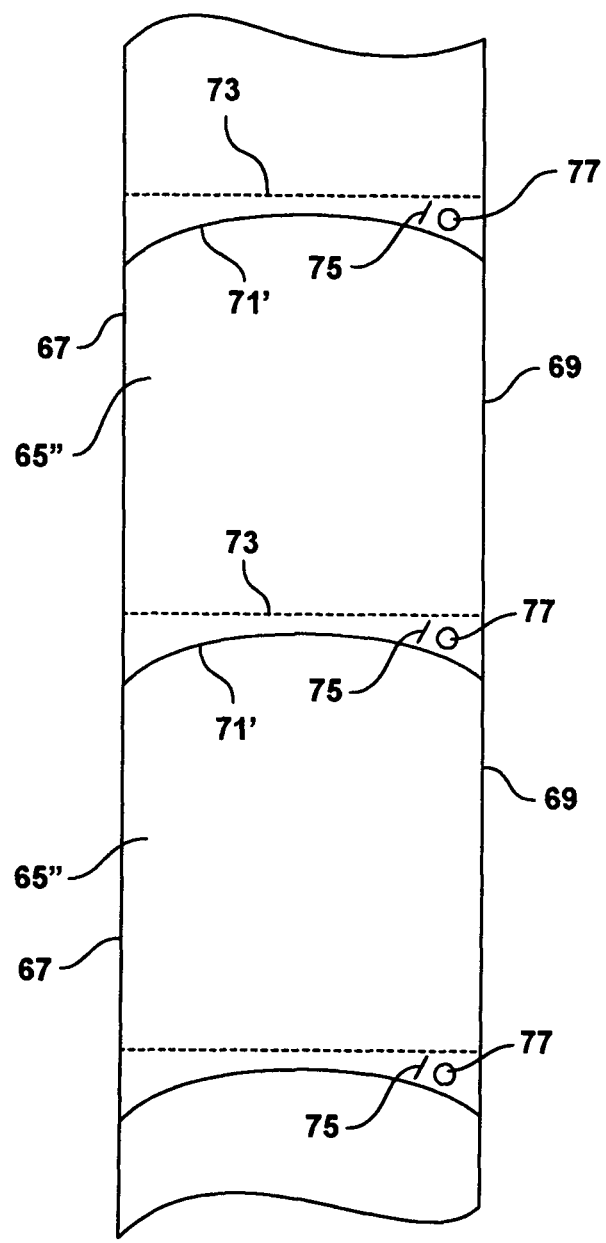
FIG. 7C is a schematic view of a third embodiment of a continuous strand of bags connected by a serration line.

Alternatively, a plurality of bags can be provided as a continuous strand of serrated bags, as illustrated in FIGS. 7A, 7B, and 7C. The continuous strands of bags in these figures are end-seal bags connected to one another in end-to-end, with a tear line of perforations being present so that bags can be torn off of the strand. FIG. 7A illustrates a portion of an elongate strip composed of a large number of end seal bags 65 made from a continuous seamless film tubing. Each end-seal bag has first side edge 67, second side edge 69, bottom seal 71, a bottom edge connected to top edge of adjoining bag along frangible tear line 73 formed by perforations through both lay-flat sides of the seamless film tubing. Each end-seal bag 65 is also provided with tear initiation means 75 and grip enhancement means 77, in the form of a hole through each lay-flat side of the bag. One or both of the holes can be made with a hanging chad therein, as described above.

FIG. 7B illustrates an alternative set of bags 65' also made from a continuous seamless film tubing. Each end-seal bag 65' has first side edge 67, second side edge 69, curved bottom seal 71', a curved bottom edge connected to a curved top edge of the adjoining bag along curved tear line 73' formed by perforations through both lay-flat sides of the seamless film tubing. Each end-seal bag 65' is also provided with tear initiation means 75, and grip enhancement means 77 in the form of a hole through each lay-flat side of the bag.

FIG. 7C illustrates an alternative set of bags 65" also made from a continuous seamless film tubing. Each end-seal bag 65" has first side edge 67, second side edge 69, curved bottom seal 71', and straight bottom edge connected to a straight top edge of the adjoining bag along straight tear line 73 formed by perforations through both lay-flat sides of the seamless film tubing. Each end-seal bag 65" is also provided with tear initiation means 75, and grip enhancement means 77 in the form of holes through each lay-flat side of the bag.

The combination of the straight tear line 73 and the curved bottom seal 71' in the strand of serrated bags illustrated in FIG. 7C, provide extra space for the tear initiation means and the means for manual grip enhancement while at the same time providing a curved seal to better fit a variety of meat products to be packaged in the shrinkable bags. Otherwise, the tear initiation means and the means for manual grip enhancement require greater bag skirt length (e.g., the bags in FIGS. 7A and 7B) to provide the same amount of space for the tear initiation means and the means for manual grip enhancement. Moreover, straight tear line 73 provides bags that avoid the curvature at the open top end of the bag. Curved top bag edges of a curved edge bag top as in the bags of FIG. 7B can cause problems on various commercial automated bag loaders that utilize pressurized air inflation to open the bag, as the pointed edge regions of the bags tend to fold inward. Moreover, the pointed edge of a curved edge bag top may get out of the required alignment for use with suction cup style bag commercial bag opening devices.

FIG. 8 illustrates a schematic of a preferred process for producing the multilayer heat-shrinkable film from which the bag is made. In the process illustrated in FIG. 8, solid polymer beads (not illustrated) are fed to a plurality of extruders 120 (for simplicity, only one extruder is illustrated). Inside extruders 120, the polymer beads are forwarded, melted, and degassed, following which the resulting bubble-free melt is forwarded into die head 122, and extruded through an annular die, resulting in tubing 124 which is 10 to 30 mils thick, more preferably 15 to 25 mils thick.

After cooling or quenching by water spray from cooling ring 126, tubing 124 is collapsed by pinch rolls 128, and is thereafter fed through irradiation vault 130 surrounded by shielding 132, where tubing 124 is irradiated with high energy electrons (i.e., ionizing radiation) from iron core transformer accelerator 134. Tubing 124 is guided through irradiation vault 130 on rolls 136. Preferably, tubing 124 is irradiated to a level of about 4.5 MR.

After irradiation, irradiated tubing 138 is directed through nip rolls 140, following which tubing 138 is slightly inflated, resulting in trapped bubble 142. However, at trapped bubble 142, the tubing is not significantly drawn longitudinally, as the surface speed of nip rolls 144 are about the same speed as nip rolls 140. Furthermore, irradiated tubing 138 is inflated only enough to provide a substantially circular tubing without significant transverse orientation, i.e., without stretching.

Slightly inflated, irradiated tubing 138 is passed through vacuum chamber 146, and thereafter forwarded through coating die 148. Second tubular film 150 is melt extruded from coating die 148 and coated onto slightly inflated, irradiated tube 138, to form two-ply tubular film 152. Second tubular film 150 preferably comprises an $O_2$-barrier layer, which does not pass through the ionizing radiation. Further details of the above-described coating step are generally as set forth in U.S. Pat. No. 4,278,738, to BRAX et. Al., which is hereby incorporated by reference thereto, in its entirety.

After irradiation and coating, two-ply tubing film 152 is wound up onto windup roll 154. Thereafter, windup roll 154 is removed and installed as unwind roll 156, on a second stage in the process of making the tubing film as ultimately desired. Two-ply tubular film 152, from unwind roll 156, is unwound and passed over guide roll 158, after which two-ply tubular film 152 passes into hot water bath tank 160 containing hot water 162. The now collapsed, irradiated, coated tubular film 152 is submersed in hot water 162 (having a temperature of about 210° F.) for a retention time of at least about 5 seconds, i.e., for a time period in order to bring the film up to the desired temperature for biaxial orientation. Thereafter, irradiated tubular film 152 is directed through nip rolls 164, and bubble 166 is blown, thereby transversely stretching tubular film 152. Furthermore, while being blown, i.e., transversely stretched, nip rolls 168 draw tubular film 152 in the longitudinal direction, as nip rolls 168 have a surface speed higher than the surface speed of nip rolls 164. As a result of the transverse stretching and longitudinal drawing, irradiated, coated biaxially-oriented blown tubing film 170 is produced, this blown tubing preferably having been both stretched in a ratio of from about 1:1.5-1:6, and drawn in a ratio of from about 1:1.5-1:6. More preferably, the stretching and drawing are each performed a ratio of from about 1:2-1:4. The result is a biaxial orientation of from about 1:2.25-1:36, more preferably, 1:4-1:16. While bubble 166 is maintained between pinch rolls 164 and 168, blown tubing film 170 is collapsed by rolls 172, and thereafter conveyed through nip rolls 168 and across guide roll 174, and then rolled onto wind-up roll 176. Idler roll 178 assures a good wind-up.

Figure 9:
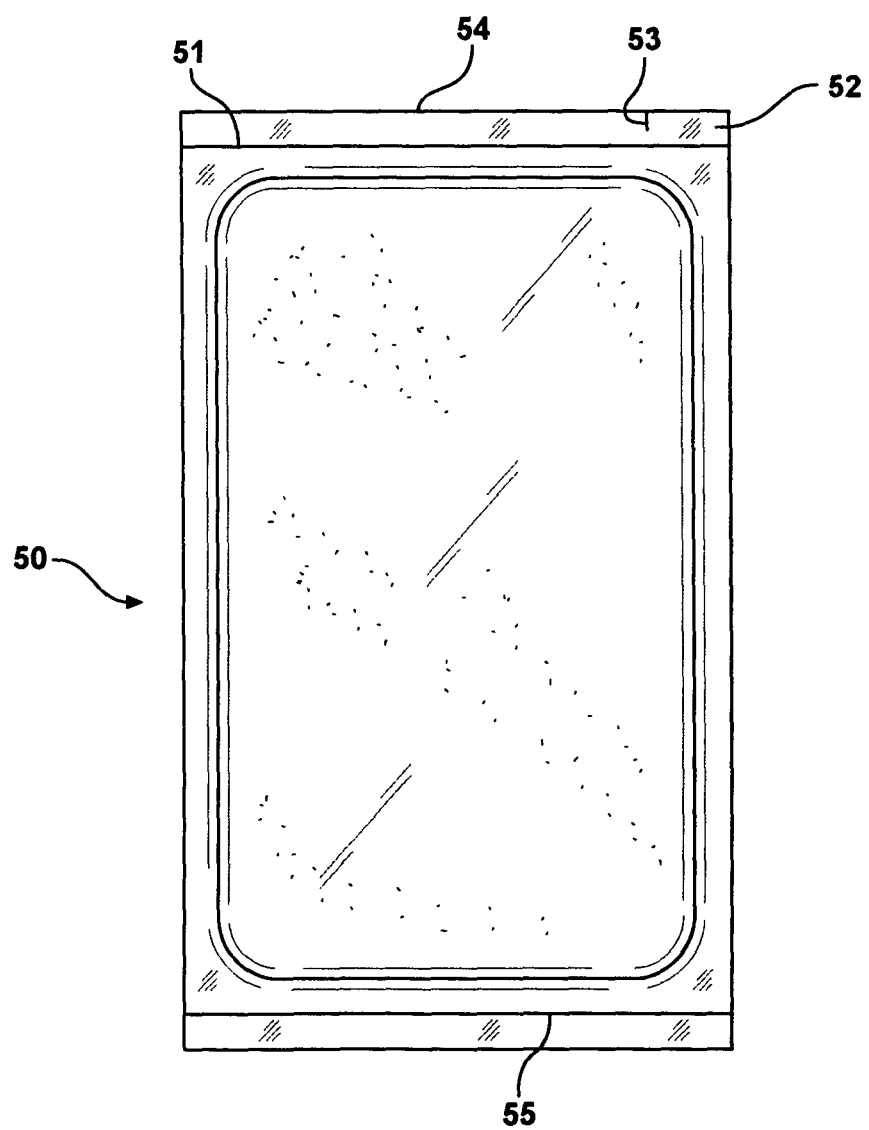
FIG. 9 is a schematic of a packaged product made up of a meat product vacuum packaged in a shrunken end-seal bag having the tear initiation feature in the bag skirt.

FIG. 9 illustrates a perspective view of package 50 made by placing a meat product into an end-seal bag having end seal 51, evacuating the atmosphere from within the bag, and sealing the bag closed with packing seal 55, and thereafter trimming off and discarding the excess bag length. Bag skirt 52 has slit 53 therein as the means for initiating manual opening of package 50. Slit 53 extends in the machine direction, toward end seal 51 from bag bottom edge 54.

Figure 10:
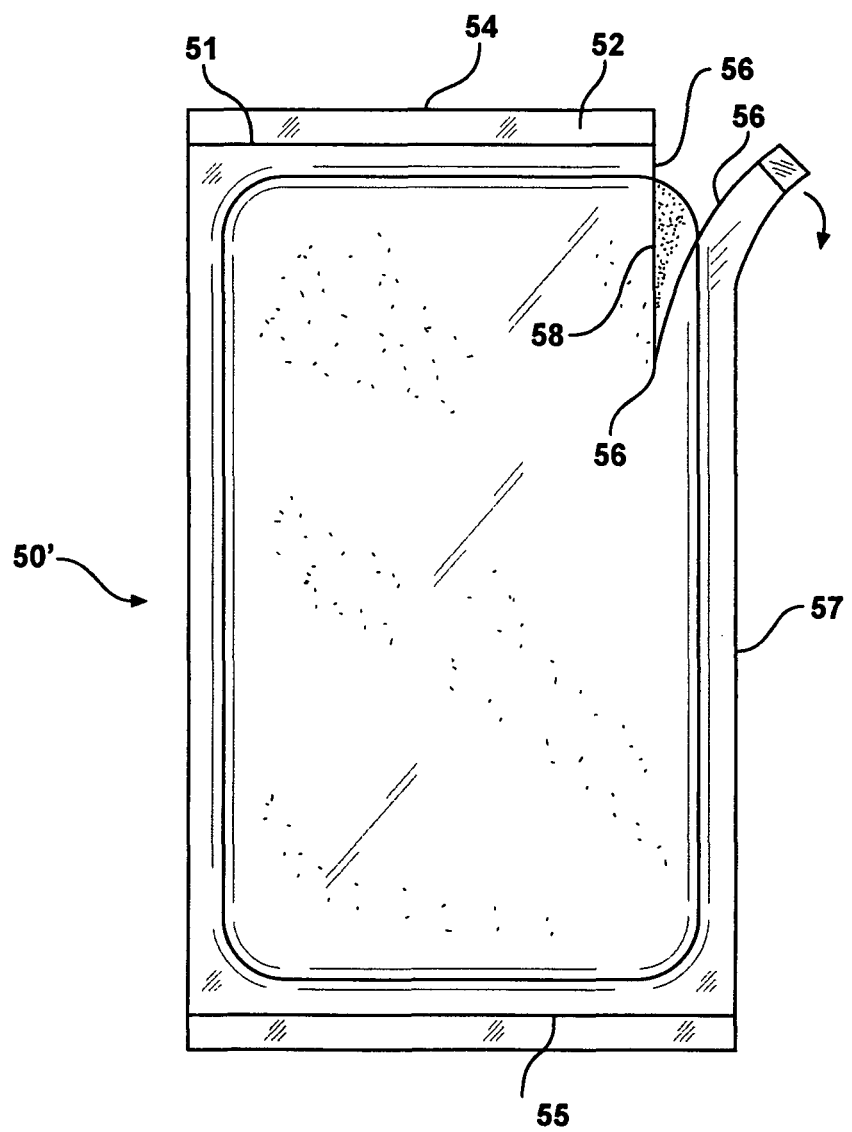
FIG. 10 is a schematic of the packaged product of FIG. 9 after the tearing has been initiated, but as the tearing remains in an intermediate state, the tearing proceeding down the bag film in the machine direction.

FIG. 10 illustrates package 50' at an intermediate stage of the manual opening process, i.e., after having initiated tearing of the bag for a distance of about 25% of the length of the bag, revealing meat product 58. Linear, machine-direction tear 56 has been manually propagated through end seal 51 and down the length of the end-seal bag. Note that machine direction tear 56 is not terminated by being propagated to side edge 57 of package 50.

Figure 11:
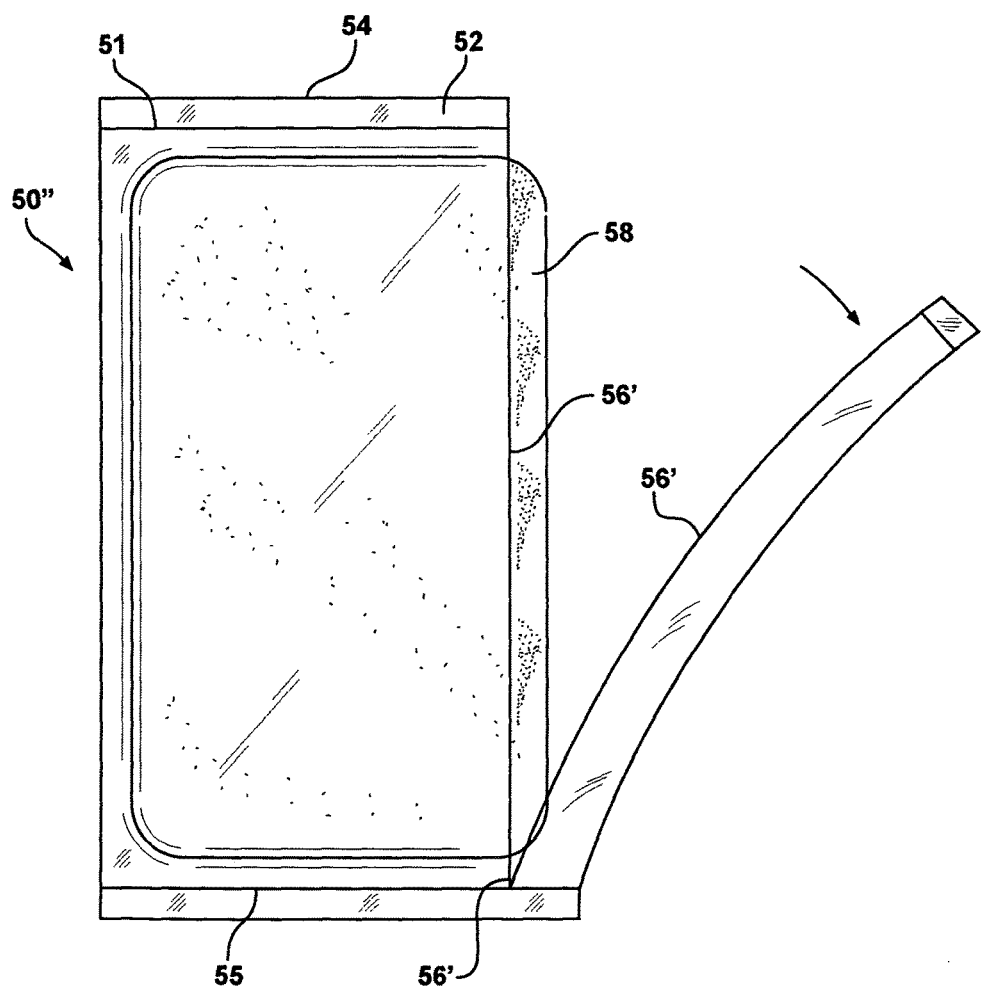
FIG. 11 is a schematic of the packaged product of FIGS. 8 and 9, after the tearing is completed.

FIG. 11 illustrates package 50" at a final stage in the manual opening process, i.e., after having torn the end-seal bag for a distance corresponding with over 90% of its length, toward the opposite bag edge of the package, exposing enough of the length of meat product 58 that the product can be readily removed from package 50". Linear, machine-direction tear 56' has been manually propagated through end seal 51 and down the length of the end-seal bag.

Figure 12:
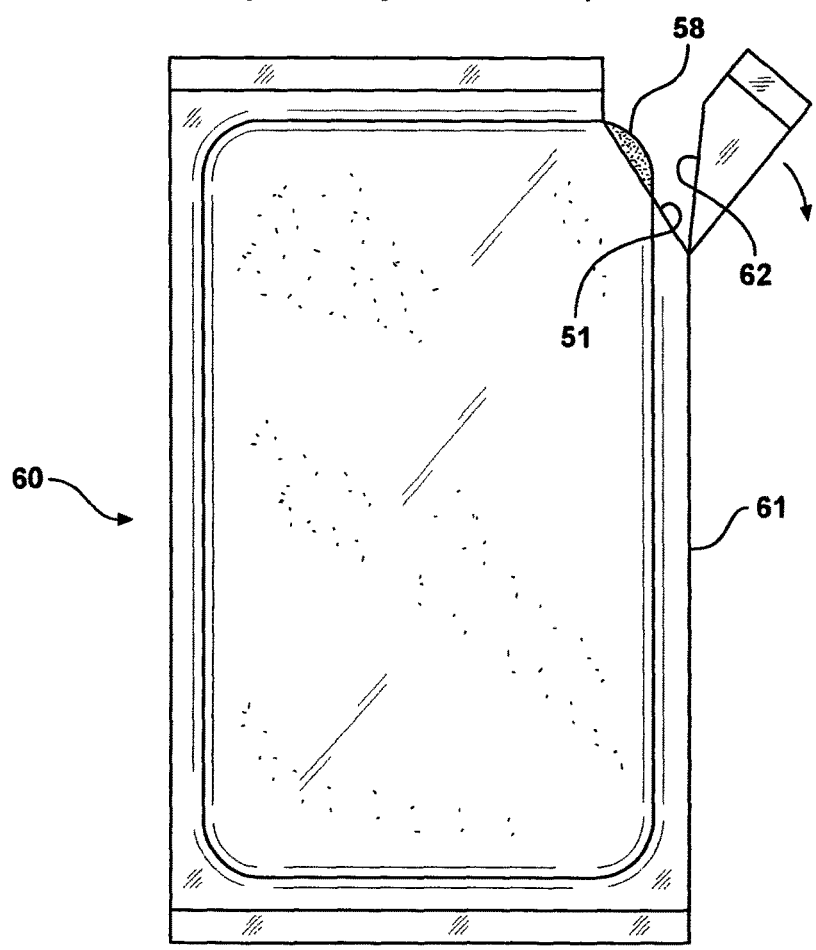
FIG. 12 is a schematic of a comparative packaged product exhibiting a tear character that does not allow tearing for the full length of the bag.

FIG. 12 illustrates a perspective view of comparative package 60 after tearing has been initiated and propagated almost to completion, i.e., almost to termination at side edge 61, about 15 to 20 percent down the length of the package. Package 60 is representative of most heat-shrinkable bags in the marketplace today, which, if provided with a means for initiating tearing in the bag skirt, undergo this type of "dog-leg" manual tear 62 initiation and propagation to side edge 61, whereby meat product 58 cannot be readily removed from torn package 60.

Figure 13:
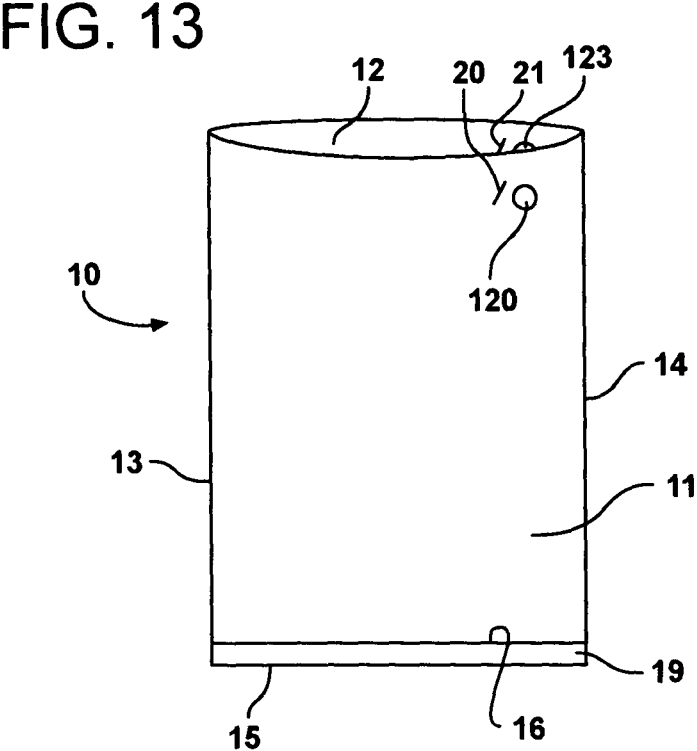
FIG. 13 is a schematic of an alternative heat-shrinkable end-seal bag in lay-flat configuration.

FIG. 13 illustrates a schematic of an alternative heat-shrinkable end-seal bag 10, in a lay-flat position. End-seal bag 10 comprises heat-shrinkable bag film 11, bag top edge 12 defining an open top, folded first side edge 13, folded second side edge 14, bottom edge 15, and end seal 16. End-seal bag 10 further has bag skirt 19 outward of end seal 16. The end-seal bag has slit 20 that is a means for initiating tearing in the first lay-flat side of the bag, and slit 21 that is a means for initiating tearing in the second lay-flat side of the bag. The end-seal bag also has hole 120 that is a means for assisting grip in the first lay-flat side of the bag, and hole 123 that is a means for assisting grip in the second lay-flat side of the bag. The means for initiating tearing and the means for assisting grip are located near bag top edge 12. When a product is placed in the bag and the bag sealed closed so that it surrounds the product, the means for initiating tearing and the means for assisting grip will then be located in the excess bag length known as the "bag tail". Frequently, the bag tail provides more area for inclusion of the means for initiating tearing and the means for assisting grip than bag skirt 19.

Figure 14:
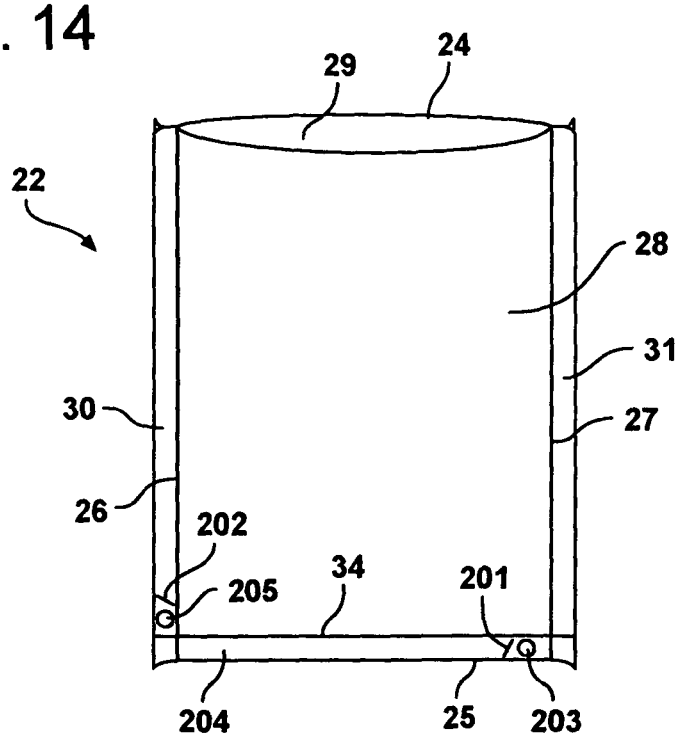
FIG. 14 is a schematic of an alternative heat-shrinkable side-seal bag in lay-flat configuration.

FIG. 14 illustrates a schematic view of alternative side-seal bag 22 in lay-flat configuration. Side-seal bag 22 comprises top edge 24 defining an open top, folded bottom edge 25, first side seal 26, and second side seal 27, transverse bottom seal 34, first lay-flat side 28, second lay-flat side 29, first bag skirt 30, and second bag skirt 31, and third bag skirt 204. First bag skirt 30 is outward of first side seal 26, second bag skirt 31 is outward of second side seal 27, and third bag skirt 204 is outside of bottom seal 34. Third bag skirt 204 comprises first tear initiation means 201 and first means for assisting grip 203, each of which are present in both lay-flat sides of bag 22. First bag skirt 30 comprises second tear initiation means 202 and second means for assisting grip 204, each of which are present in both lay-flat sides of bag 22. After a product is placed in the bag, and the bag sealed closed, side-seal bag 22 can be opened by making a first tear propagated from first means for tear initiation 201, the tear being propagated for the full length of bag 22, thereby opening the bag for removal of the product. Thereafter, side-seal bag 22 can undergo a second tear propagated from second means for tear initiation 202, the second tear being propagated across the full remaining width of bag 22, enhancing the ease of removal of the product from the opened package.

Figure 15:
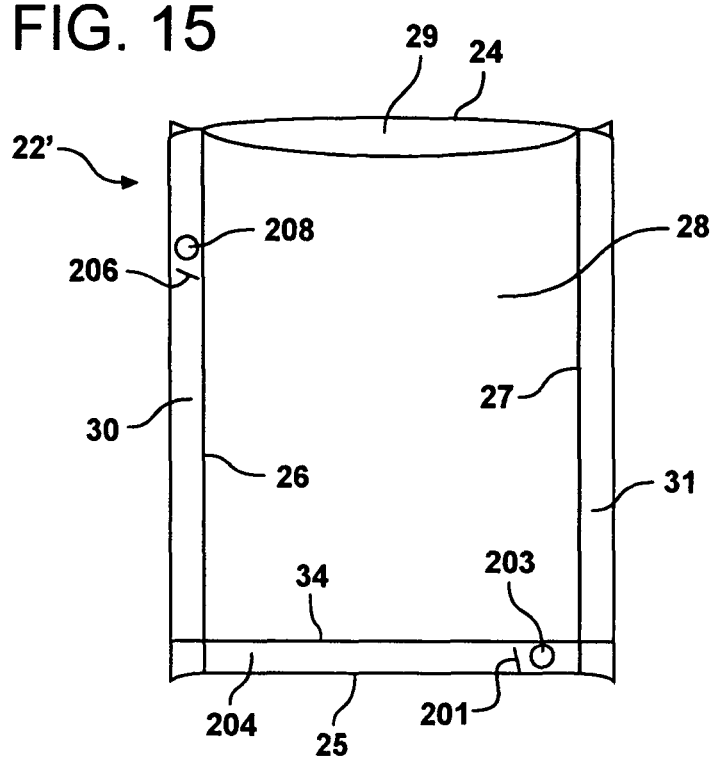
FIG. 15 is a schematic of an alternative side-seal bag in lay-flat configuration.

FIG. 15 illustrates a schematic view of alternative side-seal bag 22' in lay-flat configuration. Bag 22' has top edge 24 defining an open top, folded bottom edge 25, first side seal 26, and second side seal 27, transverse bottom seal 34, first lay-flat side 28, second lay-flat side 29, first bag skirt 30, second bag skirt 31, and third bag skirt 204. First bag skirt 30 is outward of first side seal 26, second bag skirt 31 is outward of second side seal 27, and third bag skirt 204 is outside of bottom seal 34. Third bag skirt 204 comprises first tear initiation means 201 and first means for assisting grip 203, each of which are present in both lay-flat sides of bag 22. First bag skirt 30 comprises second tear initiation means 206 and second means for assisting grip 208, each of which are present in both lay-flat sides of bag 22'. After a product is placed in the bag, and the bag sealed closed, the package made from bag 22' can be opened by making a first tear propagated from first means for tear initiation 201, the tear being propagated for the full lengths of bag 22', thereby opening the bag for removal of the product. Thereafter, bag 22' can undergo a second tear propagated from second means for tear initiation 206, the second tear being propagated across the full remaining width of bag 22', thereby enhancing the ease of removal of the product from the opened package. Unlike bag 22 of FIG. 14, the order of which tear is made first is not important in the opening of bag 22'.

Figure 16:
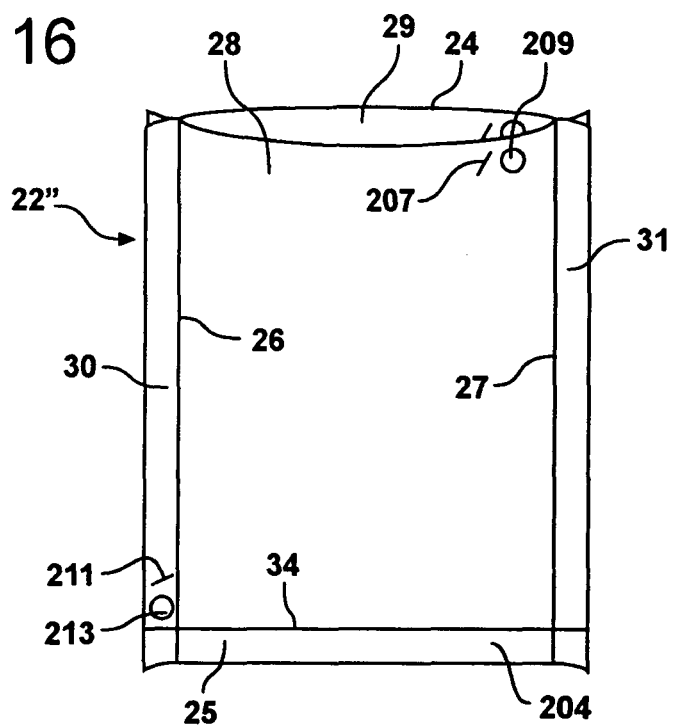
FIG. 16 is a schematic of an alternative side-seal bag in lay-flat configuration.

FIG. 16 illustrates a schematic view of alternative side-seal bag 22" in lay-flat configuration. Bag 22" has top edge 24 defining an open top, folded bottom edge 25, first side seal 26, and second side seal 27, transverse bottom seal 34, first lay-flat side 28, second lay-flat side 29, first bag skirt 30, second bag skirt 31, and third bag skirt 204. First bag skirt 30 is outward of first side seal 26, second bag skirt 31 is outward of second side seal 27, and third bag skirt 204 is outward of bottom seal 34. Near the top edge 24 of bag 22", in a region intended to be a bag tail after a product is placed into bag 22" and a seal made across bag 22" so that the product is fully enclosed within the bag, is first tear initiation means 207 and first means for assisting grip 209, each of which are present in both lay-flat sides of bag 22". First bag skirt 30 comprises second tear initiation means 211 and second means for assisting grip 213, each of which are present in both lay-flat sides of bag 22" After a product is placed in bag 22", and the bag sealed closed, the package made from bag 22" can be opened by making a first tear propagated from first means for tear initiation 207, the tear being propagated for the full lengths of bag 22", thereby opening the bag for removal of the product. Thereafter, bag 22" can undergo a second tear propagated from second means for tear initiation 211, the second tear being propagated across the full remaining width of bag 22", thereby enhancing the ease of removal of the product from the opened package.

Resins Utilized in the Examples

Unless otherwise indicated, the following listing of resins identifies the various resins utilized in Examples 1-35 below.

| Resin code | Tradename | Generic Resin Name {additional information} | Density (g/cc) | Melt Index (dg/min) | Supplier |
|---|---|---|---|---|---|
| ION 1 | Surlyn ® 1702-1 | Zinc neutralized ethylene methacrylic acid copolymer | 0.940 | 14 | DuPont |

-continued

| Resin code | Tradename | Generic Resin Name {additional information} | Density (g/cc) | Melt Index (dg/min) | Supplier |
|---|---|---|---|---|---|
| ION 2 | Surlyn ® 1650 SB | Zinc neutralized ethylene methacrylic acid copolymer + slip additive | 0.950 | 1.55 | DuPont |
| SSPE 1 | Affinity ® 1280G | Homogeneous ethylene/alpha-olefin copolymer | 0.900 | 6.0 | Dow |
| SSPE 2 | Affinity ® PL 1281G1 | Homogeneous ethylene/octene copolymer | 0.900 g/cc | 6.0 | Dow |
| SSPE3 | Affinity ® PL 1850G | Homogeneous ethylene/octene copolymer | 0.902 | 3.0 | Dow |
| SSPE4 | Affinity ® PF 1140G | Homogeneous ethylene/octene copolymer | 0.8965 g/cc | 1.6 | Dow |
| SSPE5 | DPF 1150.03 | Homogeneous Ethylene/octene copolymer | 0.901 | 0.9 | Dow |
| SSPE6 | Exceed ® 4518 PA | Homogeneous Ethylene/hexene copolymer | 0.918 | 4.5 | Exxon Mobil |
| VLDPE 1 | XUS 61520.15L | Very low density polyethylene | 0.903 | 0.5 | Dow |
| VLDPE 2 | Attane ® 4203 | Very low density polyethylene | 0.905 | 0.80 | Dow |
| VLDPE 3 | Rexell ® V3401 | Very low density polyethylene | 0.915 | 6.6 | Huntsman |
| VLDPE 4 | ECD 364 | VLDPE (ethylene/hexene copolymer) | 0.912 | 1.0 | ExxonMobil |
| LLDPE 1 | Dowlex ® 2045.03 | Linear Low Density Polyethylene | 0.920 | 1.0 | Dow |
| LLDPE 2 | LL 3003.32 | Heterogeneous Ethylene/hexene copolymer | 0.9175 | 3.2 | Exxon Mobil |
| Ion&Eva&Pb | Appel 72D799 | Blend of ionomer, EVA, and polybutylene | 0.932 | 3.7 | DuPont |
| EVA&PP | Versify XUR-YM 2006268985 | Blend of EVA and Polypropylene | 0.89 | 3.0 | Dow |
| RECLAIM | TO35B | Recycled multilayer film containing wide variety of polymers, including ionomer resin, ethylene homo- and co-polymers, propylene homo- and co-polymers, EVOH, polyamide, anhydride modified polymers, ionomer, antiblock, etc. | — | — | Sealed Air Corp |
| PP1 | Inspire 112 | Propylene homopolymer | 0.9 | 0.4 | Dow |
| PP2 | Basell Pro-Fax PH835 | Propylene homopolymer | 0.902 | 34 | Basell Polyolefins |
| PP3 | PP3155 | Propylene homopolymer | 0.900 | 36 | Exxon Mobil |
| PP4 | Escorene ® PP 3445 | Propylene homopolymer | 0.900 | 36.0 | Exxon Mobil |
| PB | PB8640M | Butene homopolymer | 0.908 | 1 | Basell Polyolefins |
| ssPP | Eltex ® P KS 409 | Propylene/ethylene copolymer | 0.900 | 5.5 | Ineos |
| znPP | Escorene ® PP9012E1 | Propylene/ethylene copolymer | 0.902 | 6.00 | Ineos |
| Et-Pr TER | Vistalon 7800 | Ethylene-propylene diene terpolymer | 0.870 | 1.5 | Exxon Mobil |
| MA-LLD 1 | Tymor 1228B | Maleic anhydride modified polyethylene {blended with linear low density polyethylene} | 0.921 | 2.0 | Rohm & Haas |
| MA-LLD 2 | PX 3227 | Maleic anhydride modified polyethylene {blended with linear low density polyethylene} | 0.913 | 1.7 | Equistar Division of Lyondell |

-continued

| Resin code | Tradename | Generic Resin Name {additional information} | Density (g/cc) | Melt Index (dg/min) | Supplier |
|---|---|---|---|---|---|
| MA-LLD 3 | PX3236 | Maleic anhydride modified polyethylene {blended with linear low density polyethylene} | 0.922 | 2.00 | Equistar Division of Lyondell |
| MA-EVA | Bynel ® 3101 | Acid/Acrylate Anhydride-Modified Ethylene/Vinyl Acetate Copolymer | 0.943 | 3.2 | DuPont |
| modPP | Admer ® QB510A | Maleic anhydride modified polypropylene | 0.900 | 3.2 | Mitsui |
| modEVA | SPS-33C-3 | Compounded modified EVA polymer blend | 0.92 | 1.6 | MSI Technology |
| Et-Norb 1 | Topas ® 9506X1 | Ethylene norbornene copolymer | 0.974 | 1.0 | Topas Advanced Polymers Inc. |
| ET-Norb2 | Topas ® 8007 F-04 | Ethylene norbornene copolymer | 1.02 | 1.7 | Topas Advanced Polymers Inc. |
| Nylon 1 | Ultramid ® B40 | Polyamide 6 | 1.13 | — | BASF |
| Nylon 2 | Ultramid ® B40LN01 | Polyamide 6 | 1.14 | — | BASF |
| Nylon 3 | Ultramid ® C33 01 | Polyamide 6/66 | 1.13 | — | BASF |
| EVA 1 | Escorene ® LD 713.93 | Ethylene/vinyl acetate copolymer (14.4% VA) | 0.933 | 3.5 | Exxon Mobil |
| EVA 2 | Escorene LD 318.92 | Ethylene/vinyl acetate copolymer (8.7% VA) | 0.93 | 2.0 | Exxon Mobil |
| EVA 3 | Escorene ® LD 761.36 | Ethylene/vinyl acetate copolymer (26.7% VA) | 0.950 | 5.75 | Exxon Mobil |
| EVA 4 | Escorene ® LD 705.MJ | Ethylene/vinyl acetate copolymer (12.8% VA) | 0.935 | 0.4 | Exxon Mobil |
| EVA 5 | Escorene ® LD 721.IK | Ethylene/vinyl acetate copolymer (18.5% VA) | 0.942 | 2.55 | Exxon Mobil |
| EVA 6 | Elvax ® 3175 | Ethylene/vinyl acetate copolymer (28% VA) | 0.950 | 6 | DuPont |
| EBA | SP 1802 | Ethylene/butyl acrylate copolymer (22.5% BA) | 0.928 | 6 | Eastman Chemical |
| EVOH | Soarnol ® ET3803 | Hydrolyzed ethylene vinyl acetate copolymer (EVOH with 38 mol % ethylene) | 1.17 | 3.2 | Nippon Gohsei |
| PVdC | Saran ® 806 | Vinylidene chloride/ methyl acrylate copolymer | 1.69 | — | Dow |
| Sty-But | Styrolux 656C | Styrene/butadiene copolymer | 1.02 | 99 | BASF |
| AOX | 10555 | Antioxidant in linear low density polyethylene | 0.932 | 2.5 | |
| SLIP 1 | FSU 93E | Slip and antiblock in low density polyethylene | 0.975 | 7.5 | Schulman |
| SLIP 2 | 1062 Ingenia | Slip masterbatch amide wax (erucamide) in linear low density polyethylene | 0.92 | 2 | Ingenia Polymers |
| WCC | 11853 | White color concentrate in linear low density polyethylene | 1.513 | 2.90 | Ampacet |
| CCC | 130374 | Cream color concentrate in low density polyethylene | — | — | Ampacet |
| ABConc | 18042 antiblock concentrate | Optical brightener in linear low density polyethylene | 0.92 | — | Teknor Color |
| procAID1 | 100458 | Processing aid: fluoropolymer in polyethylene | 0.93 | 2.3 | Ampacet |
| procAID2 | IP 1121 | Processing aid: fluoropolymer in linear low density polyethylene | 0.92 | 2 | Ampacet |

Example 1 (Working)

An end-seal bag was made from a coextruded, multilayer, heat-shrinkable film produced utilizing the apparatus and process set forth in FIG. 5, described above. The multilayer film had a total of 7 layers, in the following order, with the thickness of each layer of the film shown in mils in the bottom row of each column representing a layer of the multilayer structure. The composition of each layer is provided in the second row, with each code corresponding with the composition in the resin table set forth above.

Example 1

| Layer 1 | Layer 2 | Layer 3 | Layer 4 | Layer 5 | Layer 6 | Layer 7 |
|---|---|---|---|---|---|---|
| 80% SSPE1 20% LLDPE 2 | 70% VLDPE2 30% EVA1 | 100% EVA1 | PVDC | 100% EVA3 | 70% VLDPE1 30% EVA1 | 85% SSPE3 15% LLDPE 1 |
| 0.42 mil | 0.76 mil | 0.08 mil | 0.18 mil | 0.13 mil | 0.25 mil | 0.13 mils |

Example 2 (Working)

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above.

Example 2

| Layer 1 | Layer 2 | Layer 3 | Layer 4 | Layer 5 | Layer 6 | Layer 7 |
|---|---|---|---|---|---|---|
| 80% SSPE2 20% LLDPE 2 | 70% VLDPE1 30% EVA1 | 100% EVA1 | PVDC | 100% EVA3 | 70% VLDPE1 30% EVA1 | 80% SSPE3 20% LLDPE 1 |
| 0.43 mil | 0.78 mil | 0.09 mil | 0.18 mil | 0.09 mil | 0.26 mil | 0.17 mils |

Example 3 (Comparative)

An end-seal bag was made from a coextruded, multilayer, heat-shrinkable film produced utilizing the apparatus and process set forth in FIG. 5, described above. The multilayer film had a total of 4 layers, with the order, thickness, and composition being set forth in the table below in a manner corresponding with the description in Example 1, above.

Example 3 (Comparative)

| Layer 1 | Layer 2 | Layer 3 | Layer 4 |
|---|---|---|---|
| 100% VLDPE3 | 100% EVA2 | 100% PVDC | 100% EVA 2 |
| 0.26 mil | 1.26 mils | 0.18 mil | 0.6 mil |

Example 4 (Comparative)

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above.

Example 4 (Comparative)

| Layer 1 | Layer 2 | Layer 3 | Layer 4 | Layer 5 | Layer 6 | Layer 7 |
|---|---|---|---|---|---|---|
| 90% SSPE1 10% SLIP1 | 80% VLDPE2 20% LLDPE1 | 100% EVA1 | 100% PVDC | 100% EVA3 | 99% VLDPE2 1% AOX | 85% SSPE3 15% LLDPE 1 |
| 0.44 mil | 0.71 mil | 0.09 mil | 0.18 mil | 0.09 mil | 0.27 mil | 0.18 mils |

Example 5 (Comparative)

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above.

Example 5 (Comparative)

| Layer 1 | Layer 2 | Layer 3 | Layer 4 | Layer 5 | Layer 6 | Layer 7 |
|---|---|---|---|---|---|---|
| 80% SSPE2 20% LLDPE 2 | 80% VLDPE1 20% VLDPE4 | 100% EVA1 | 100% PVDC | 100% EVA3 | 80% VLDPE1 20% VLDPE4 | 80% SSPE3 20% LLDPE 1 |
| 0.46 mil | 1.11 mil | 0.09 mil | 0.18 mil | 0.09 mil | 0.28 mil | 0.18 mils |

Example 6 (Comparative)

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above.

Example 6 (Comparative)

| Layer 1 | Layer 2 | Layer 3 | Layer 4 | Layer 5 | Layer 6 | Layer 7 |
|---|---|---|---|---|---|---|
| 90% SSPE1 10% SLIP 2 | 90% SSPE5 10% Et-PrTER | 100% EVA1 | 100% PVDC | 100% EVA3 | 80% SSPE5 20% VLDPE1 | 100% SSPE3 |
| 0.49 mil | 0.89 mil | 0.1 mil | 0.19 mil | 0.1 mil | 0.26 mil | 0.18 mils |

Example 7 (Comparative)

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above.

Example 7 (Comparative)

| Layer 1 | Layer 2 | Layer 3 | Layer 4 | Layer 5 | Layer 6 | Layer 7 |
|---|---|---|---|---|---|---|
| 100% ION 1 | 100% EVA1 | 100% EVA1 | PVDC | 100% EVA3 | 100% SSPE4 | 85% SSPE3 15% LLDPE1 |
| 0.32 mil | 0.87 mil | 0.16 mil | 0.18 mil | 0.08 mil | 0.21 mil | 0.12 mils |

Example 8

An end-seal bag was made from a coextruded, multilayer, heat-shrinkable film produced utilizing the apparatus and process set forth in FIG. 5, described above. The multilayer film had a total of 4 layers, with the order, thickness, and composition being set forth in the table below in a manner corresponding with the description in Example 1, above.

Example 8

| Layer 1 | Layer 2 | Layer 3 | Layer 4 |
|---|---|---|---|
| | 84% | 85% | 85% |
| | LLDPE1 | EVA2 | EVA2 |
| 100% SSPE6 | 16% CCC | 15% LLDPE1 | 15% LLDPE1 |
| 0.25 mil | 1.09 mil | 0.76 mil | 0.25 mil |

Example 9

An end-seal bag was made from a coextruded, multilayer, heat-shrinkable film produced utilizing the apparatus and process set forth in FIG. 5, described above. The multilayer film had a total of 6 layers, with the order, thickness, and composition being set forth in the table below in a manner corresponding with the description in Example 1, above.

Example 9

| Layer 1 100% SSPE6 | Layer 2 100% VLDPE2 | Layer 3 100% EVA2 | Layer 4 100% EVA2 | Layer 5 100% VLDPE2 | Layer 6 85% EVA2 15% LLDPE1 |
|---|---|---|---|---|---|
| 0.31 mil | 0.8 mil | 0.09 mil | 0.13 mil | 0.4 mil | 0.27 mils |

Example 10

An end-seal bag was made from a coextruded, multilayer, heat-shrinkable film produced utilizing the apparatus and process set forth in FIG. 5, described above. The multilayer film had a total of 3 layers, with the order, thickness, and composition being set forth in the table below in a manner corresponding with the description in Example 1, above.

Example 10

| Layer 1 80% SSPE1 20% LLDPE2 | Layer 2 100% EBA | Layer 3 85% SSPE3 15% LLDPE1 |
|---|---|---|
| 0.08 mil | 1.84 mil | 0.08 mil |

Example 11 (Working)

An end-seal bag was made from a coextruded, multilayer, heat-shrinkable film produced utilizing the apparatus and process set forth in FIG. 5, described above. The multilayer film had a total of 3 layers, with the order, thickness, and composition being set forth in the table below in a manner corresponding with the description in Example 1, above.

Example 11 (Working)

| Layer 1 100% EVA 6 | Layer 2 75% VLDPE2 25% LLDPE1 | Layer 3 75% VLDPE2 16.5% LLDPE1 8.5% ABConc |
|---|---|---|
| 0.68 mil | 3.08 mil | 1.24 mil |

Example 12 (Working)

An end-seal bag marketed commercially by Curwood, Inc., under the name "Protite™ 34" was obtained from the marketplace. Analysis of the bag from which the multilayer film was made revealed the following layers, with the order, thickness, and composition being set forth in the table below. A small cut was made into the bag skirt, i.e., as illustrated in FIG. 4A.

Example 12 (Working)

| Layer 1 Blend of EVA (3% vinyl acetate), LLDPE, and metallocene-catalyzed ethylene/alpha-olefin copolymer | Layer 2 Polyvinylidene chloride | Layer 3 Blend of EVA (3% vinyl acetate), LLDPE, and metallocene-catalyzed ethylene/alpha-olefin copolymer |
|---|---|---|
| 1.53 mil | 0.21 mil | 0.74 mil |

Example 13 (Comparative)

An end-seal bag marketed commercially by Curwood, Inc., under the name "Cleartite™ 52" was obtained from the marketplace. Analysis of the bag from which the multilayer film was made revealed the following layers, with the order, thickness, and composition being set forth in the table below. A small cut was made into the bag skirt, i.e., as illustrated in FIG. 4A.

Example 13 (Comparative)

| Layer 1 Blend of EVA (4% vinyl acetate), LLDPE, and metallocene-catalyzed ethylene/alpha-olefin copolymer | Layer 2 Polyvinylidene chloride | Layer 3 Blend of EVA (4% vinyl acetate), LLDPE, and metallocene-catalyzed ethylene/alpha-olefin copolymer |
|---|---|---|
| 1.39 mil | 0.23 mil | 0.68 mil |

Example 14 (Comparative)

An end-seal bag marketed commercially by Curwood, Inc., under the name "Perflex™ 64" was obtained from the marketplace. Analysis of the bag from which the multilayer film was made revealed the following layers, with the order, thickness, and composition being set forth in the table below. A small cut was made into the bag skirt, i.e., as illustrated in FIG. 4A.

Example 14 (Comparative)

| Layer 1 Blend of EVA (4% vinyl acetate), LLDPE, and metallocene-catalyzed ethylene/alpha-olefin copolymer | Layer 2 Polyvinylidene chloride | Layer 3 Blend of EVA (4% vinyl acetate), LLDPE, and metallocene-catalyzed ethylene/alpha-olefin copolymer |
|---|---|---|
| 1.54 mil | 0.19 mil | 0.63 mil |

Example 15 (Comparative)

An end-seal bag marketed commercially by Asahi Corporation, under the name "SN3" was obtained from the marketplace. Analysis of the bag from which the multilayer film was made revealed the following layers, with the order, thickness, and composition being set forth in the table below. A small cut was made into the bag skirt, i.e., as illustrated in FIG. 4A.

Example 15 (Comparative)

| Layer 1<br>Polyethylene blend | Layer 2<br>Ethylene/vinyl acetate copolymer, containing (15 wt % vinyl acetate mer) | Layer 3<br>Polyvinylidene chloride | Layer 4<br>Ethylene/vinyl acetate copolymer, containing (15 wt % vinyl acetate mer) | Layer 5<br>Low Density Polyethylene (possibly a blend) |
|---|---|---|---|---|
| 0.39 mil | 0.7 | 0.35 mil | 0.66 | 0.63 mil |

Example 16 (Working)

An end-seal bag marketed commercially by Pechiney Plastic Packaging, Inc., under the name "Clearshield™" was obtained from the marketplace. Analysis of the bag from which the multilayer film was made revealed the following layers, with the order, thickness, and composition being set forth in the table below. A small cut was made into the bag skirt, i.e., as illustrated in FIG. 4A.

Example 16 (Working)

| Layer 1<br>Metallocene-catalyzed ethylene/alpha-olefin copolymer (possibly with LDPE or LLDPE) | Layer 2<br>100% Ethylene/methyl acrylate copolymer | Layer 3<br>Blend of polyamide 6 with polyamide 6I, 6T | Layer 4<br>EVOH (27 mol % ethylene) | Layer 5<br>Blend of polyamide 6 with polyamide 6I, 6T | Layer 6<br>100% Ethylene/methyl acrylate copolymer | Layer 7<br>Blend of low density polyethylene and linear low density polyethylene |
|---|---|---|---|---|---|---|
| 1.58 mil | 0.22 mil | 0.9 mil | 0.21 mil | 0.85 mil | 0.16 mil | 0.57 mil |

Example 17 (Working)

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above.

Example 17 (Working)

| Layer 1 | Layer 2 | Layer 3 | Layer 4 | Layer 5 | Layer 6 | Layer 7 |
|---|---|---|---|---|---|---|
| 90% SSPE1<br>10% SLIP2 | 100% Ion&Eva&PB | 50% EVA4<br>50% LLDPE1 | 100% PVdC | 100% EVA3 | 80% VLDPE1<br>20% VLDPE4 | 80% SSPE3<br>20% LLDPE1 |
| 3.0 mil[r] | 3.7 mil[r] | 11.4 mil[r] | 2.2 mil[r] | 1 mil[r] | 1.5 mils[r] | 1.5[r] |

[r]thickness in table represents thickness of extrudate before solid state orientation at trapped bubble stage of process

Example 18 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% EVA&PP | 50% EVA4 50% LLDPE1 | 100% PVdC | 100% EVA3 | 80% VLDPE1 20% VLDPE4 | 80% SSPE3 20% LLDPE1 |
| 3.0 mil[t] | 3.7 mil[t] | 11.4 mil[t] | 2.2 mil[t] | 1 mil[t] | 1.5 mils[t] | 1.5[t] |

[t]thickness in table represents thickness of extrudate before solid state orientation at trapped bubble stage of process

Example 19 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 75% EVA2 25% modEVA | 50% EVA4 50% LLDPE1 | 100% PVdC | 100% EVA3 | 80% VLDPE1 20% VLDPE4 | 80% SSPE3 20% LLDPE1 |
| 3.0 mil[t] | 3.7 mil[t] | 11.4 mil[t] | 2.2 mil[t] | 1 mil[t] | 1.5 mils[t] | 1.5[t] |

[t]thickness in table represents thickness of extrudate before solid state orientation at trapped bubble stage of process

Example 20 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% Et-Norb2 | 50% EVA4 50% LLDPE1 | 100% PVdC | 100% EVA3 | 80% VLDPE1 20% VLDPE4 | 80% SSPE3 20% LLDPE1 |
| 3.0 mil[t] | 3.7 mil[t] | 11.4 mil[t] | 2.2 mil[t] | 1 mil[t] | 1.5 mils[t] | 1.5[t] |

[t]thickness in table represents thickness of extrudate before solid state orientation at trapped bubble stage of process

Example 21 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% Et-Norb1 | 50% EVA4 50% LLDPE1 | 100% PVdC | 100% EVA3 | 80% VLDPE1 20% VLDPE4 | 80% SSPE3 20% LLDPE1 |
| 3.0 mil[t] | 3.7 mil[t] | 11.4 mil[t] | 2.2 mil[t] | 1 mil[t] | 1.5 mils[t] | 1.5[t] |

[t]thickness in table represents thickness of extrudate before solid state orientation at trapped bubble stage of process

Example 22 (Comparative)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% Sty-But | 50% EVA4 50% LLDPE1 | 100% PVdC | 100% EVA3 | 80% VLDPE1 20% VLDPE4 | 80% SSPE3 20% LLDPE1 |
| 3.0 mil[t] | 3.7 mil[t] | 11.4 mil[t] | 2.2 mil[t] | 1 mil[t] | 1.5 mils[t] | 1.5[t] |

[t]thickness in table represents thickness of extrudate before solid state orientation at trapped bubble stage of process

Example 23 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% PP1 | 50% EVA4 50% LLDPE1 | 100% PVdC | 100% EVA3 | 80% VLDPE1 20% VLDPE4 | 80% SSPE3 20% LLDPE1 |
| 3.0 mil[t] | 3.7 mil[t] | 11.4 mil[t] | 2.2 mil[t] | 1 mil[t] | 1.5 mils[t] | 1.5[t] |

[t]thickness in table represents thickness of extrudate before solid state orientation at trapped bubble stage of process

Example 24 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% Sty-But 30% EVA5 | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 25 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% Sty-But 30% EVA2 | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 26 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% VLDPE2 30% ET-Norb2 | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 27 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% ssPP 30% SSPE3 | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mil*t* | 1.5*t* |

*t*thickness in table represents thickness of extrudate before solid state orientation at trapped bubble stage of process

Example 28 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% ssPP 30% EVA2 | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 29 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 80% SSPE3 20% WCC | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 30 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% ION 2 | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 31 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% EVA6 | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 32 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% PB | 50% EVA4 50% LLDPE1 | 100% PVdC | 100% EVA3 | 80% VLDPE1 20% VLDPE4 | 80% SSPE3 20% LLDPE1 |
| 3.0 mil*t* | 3.7 mil*t* | 11.4 mil*t* | 2.2 mil*t* | 1 mil*t* | 1.5 mils*t* | 1.5*t* |

*t*thickness in table represents thickness of extrudate before solid state orientation at trapped bubble stage of process

Example 33 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 85% SSPE1 15% RECLAIM | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 34 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% SSPE1 30% RECLAIM | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 35

| Layer 1 | Layer 2 | Layer 3 | Layer 4 | Layer 5 | Layer 6 | Layer 7 |
|---|---|---|---|---|---|---|
| 90% SSPE1 10% SLIP2 | 55% SSPE1 45% RECLAIM | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process A seamless film tubing of each of the films of Examples 1-35 is cut and sealed to form an end-seal bag. A small cut was made in the bag skirt, about 1 to 2 inches from the folded bag side edge. The bag skirt had a width of about 1.5 inches. A product was placed in the bag, and the bag was sealed closed and shrunk around the product. The resulting end-seal bags exhibit the following characteristics.

| Bag of Example No. | Total Film Gauge (mils) | Free Shrink at 185° F. (% MD/ % TD) | Straight, Full Length Manual MD Tear | LD Tear Propagation Max Load (gmf, i.e., grams force) | LD Tear Propagation Energy to Break (gmf-in) | LD Tear Resistance Max Load (gmf) | Peak Load Impact Strength per mil, via ASTM D 3763-95A (N/mil) |
|---|---|---|---|---|---|---|---|
| 1 | 2.0 | 32/45 | Yes | 31 | — | 545 | 98 |
| 2 | 2.0 | 35/51 | Yes | 23 | 31 | 598 | 114* |
| 3 | 2.3 | — | No | 22 | 36 | 673 | 54.9* |
| 4 | 1.96 | — | No | 31 | 39 | 566 | 102.6* |
| 5 | 2.4 | — | No | 54 | 58 | 791 | 100* 114.3* 137.2* |
| 6 | 2.2 | — | No | 61 | 68 | 625 | 138.7* 104.5* |
| 7 | 1.9 | — | No | 28 | 34 | 659 | 102* |
| 8 | 2.35 | 17/28 | — | 24.8 | — | — | 113* |
| 9 | 2.0 | 26/42 | — | — | — | — | 110* |
| 10 | 2.0 | — | — | — | — | — | — |
| 11 | 5.0 | — | Yes | 50 | 86 | 1470 | 105* |
| 12 | 2.18 | 32/40 | Yes | 20 | 38 | 840 | 116.3 |
| 13 | 2.03 | 35/39 | No | 22 | 35 | 732 | 73.9 |

-continued

| Bag of Example No. | Total Film Gauge (mils) | Free Shrink at 185° F. (% MD/% TD) | Straight, Full Length Manual MD Tear | LD Tear Propagation Max Load (gmf, i.e., grams force) | LD Tear Propagation Energy to Break (gmf-in) | LD Tear Resistance Max Load (gmf) | Peak Load Impact Strength per mil, via ASTM D 3763-95A (N/mil) |
|---|---|---|---|---|---|---|---|
| 14 | 2.18 | 22/30* | No | 23 | 44 | 732 | — |
| 15 | 2.47 | 50/50 | No | 279 | 330 | 685 | 71.9 |
| 16 | 4.6 | | Yes | 284 | 440 | 3110 | 155.0 |
| 17 | 2.42 | 24/36 | Yes | 35 | — | 747 | — |
| 18 | 2.48 | 19/36 | Yes | 205 | — | 797 | — |
| 19 | 2.48 | 20/35 | Yes | 23 | — | 817 | — |
| 20 | — | — | Yes | — | — | — | — |
| 21 | 2.56 | 23/33 | Yes | 21 | 30 | 676 | — |
| 22 | 2.53 | 24/36 | No | 40 | — | 726 | — |
| 23 | 2.53 | 20/33 | Yes | 21 | 29 | 724 | — |
| 24 | 2.5 | 23/34 | Yes | 32 | 47 | 848 | — |
| 25 | 2.5 | 22/34 | Yes | 22 | 35 | 707 | — |
| 26 | 2.51 | 24/32 | Yes | 20 | 27 | 723 | — |
| 27 | 2.39 | 18/32 | Yes | 13 | 23 | 843 | — |
| 28 | 2.36 | 15/34 | Yes | 21 | — | 820 | — |
| 29 | 2.39 | 17/34 | Yes | 17 | 30 | 643 | — |
| 30 | 2.29 | — | Yes | 71.0 | 81 | 551 | — |
| 31 | 2.31 | — | Yes | 15.3 | — | 557 | — |
| 32 | 2.18 | — | Yes | 113.0 | 140 | 693 | — |
| 33 | 2.55 | — | Yes | 55.0 | 50 | 427 | — |
| 34 | 2.41 | — | Yes | 57.3 | 55 | 477 | — |
| 35 | 2.45 | — | Yes | 40.2 | 46 | 638 | — |

*impact strength tested on different sample of film with same designation

What is claims:

1. A heat-shrinkable bag comprising a heat-shrinkable multilayer film having an inside seal layer heat sealed to itself at a heat seal, the bag further comprising a first side, a second side, an open top, and a bag skirt outward of the heat seal, the bag skirt comprising a bag edge and a first means for initiating tearing, the first means being in the first side of the bag, the bag skirt also comprising a second means for initiating tearing, the second means being in the second side of the bag, the bag being capable of having a manually-initiated, manually-propagated first tear in a machine direction in the first side of the bag, and a manually-initiated and manually-propagated second tear in the machine direction in the second side of the bag, the first tear and the second tear each being capable of being propagated in the machine direction from the respective first and second means for initiating tearing, with each tear being propagated through the heat seal and across the bag, or down the length of the bag, with the tears being capable of being manually propagated in the machine direction through and to an opposite bag edge, so that upon making a package by placing a product inside the bag, sealing the bag closed so that a package is formed, and shrinking the film around the product, the resulting package can be manually opened, and the product readily removed from the bag, by manually initiating tears in the machine direction from the first and second means for initiating tearing, with the tears being manually propagated in the machine direction through the seal and to the opposite bag edge, and wherein the multilayer film exhibits a Peak Load Impact Strength, determined using ASTM D 3763-95A, of at least 50 Newtons per mil, wherein the bag further comprises a means for assisting grip of the multilayer film, wherein the means for assisting grip comprises a partial hole cut having a hanging chad therein, and wherein the heat-shrinkable bag does not comprise a patch thereon, and wherein at least one layer of the multilayer film comprises an incompatible polymer blend selected from the group consisting of:

(A) a blend of ethylene/alpha-olefin copolymer with ethylene/vinyl acetate;
(B) a blend of ionomer resin with ethylene/vinyl acetate copolymer, and/or polybutylene, and/or polypropylene;
(C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and antiblock;
(D) a blend of ethylene/vinyl acetate copolymer with polypropylene, and/or polybutylene, and/or modified ethylene/vinyl acetate copolymer, and/or polystyrene;
(E) a blend of ethylene/alpha-olefin copolymer with polypropylene and/or polybutylene;
(F) a blend of single site catalyzed polypropylene with homogeneous ethylene/alphaolefin copolymer and/or ethylene/vinyl acetate;
(G) a blend of polypropylene and/or ethylene/propylene copolymer and/or polybutylene with ethylene/methyl acrylate copolymer and/or ethylene/acrylic acid copolymer and/or ethylene/butyl acrylate copolymer; and
(H) a blend of polyamide with polystyrene and/or ethylene/alpha-olefin copolymer and/or ethylene/vinyl acetate copolymer and/or styrene/butadiene copolymer.

2. The heat-shrinkable bag according to claim 1, wherein the bag is a lay-flat, end-seal bag made from a seamless tubing, the end-seal bag having an open top, first and second folded side edges, and an end seal across a bottom of the bag, with the first and second means for initiating tearing being in the bag skirt that is outward of the end seal, with the first tear being a machine-direction tear of the film, and the second tear being a machine-direction tear of the film, with each tear being capable of being manually propagated down the length of the end-seal bag to the opposite edge of the end-seal bag.

3. The heat-shrinkable bag according to claim 1, wherein the bag is a lay-flat, side-seal bag made from a seamless tubing, the side-seal bag having an open top, a folded bottom edge, and first and second side seals with respective first and second bag skirts outward of respective first and second side seals, with the first and second means for initiating tearing being in the first bag skirt and outward of the first side seal, with the first tear being a machine-direction tear and the second tear being a machine-direction tear, with each tear being capable of being manually propagated across the full width of the side-seal bag to the opposite edge of the side-seal bag.

4. The heat-shrinkable bag according to claim 1, wherein the multilayer film exhibits a Peak Load Impact Strength, determined using ASTM D 3763-95A, of from 50 to 250 Newtons per mil, and the multilayer film has a total thickness, before shrinking, of from 1.5 mils to 5 mils.

5. The heat-shrinkable bag according to claim 1, wherein the first means for initiating tearing is overlapping or coincident with the second means for initiating tearing, with the bag further comprising a third means for initiating tearing and a fourth means for initiating tearing that is overlapping or coincident with the third means for initiating tearing, with the first and second means for initiating tearing being positioned in a bag skirt for making a manual tear in a machine direction, and the third and fourth means for initiating tearing being positioned for making a manual tear in a transverse direction.

6. The heat-shrinkable bag according to claim 1, wherein upon making a package by placing a product inside the bag, evacuating the atmosphere from the bag, sealing the bag closed so that a package is formed, and shrinking the film around the product, the resulting package can be manually opened, and the product readily removed from the bag, by manually initiating tears from the first and second means for initiating tearing.

7. The heat-shrinkable bag according to claim 1, wherein at least one layer of the multilayer film comprises a polymer having a Young's modulus of at least 80,000 psi.

8. The heat-shrinkable bag according to claim 1, wherein at least one layer of the multilayer film comprises an inorganic filler.

9. The heat-shrinkable bag according to claim 8, wherein the filler comprises at least one member selected from the group consisting of silicate, silica, silicone resin, zinc sulfide, wollastonite, microsphere, glass fiber, metal oxide, calcium carbonate, sulfate, aluminum trihydrate, feldspar, perlite, gypsum, iron, fluoropolymer, crosslinked polymethylmethacrylate, talc, diatomaceous earth, zeolite, mica, kaolin, carbon black, and graphite.

10. The heat-shrinkable bag according to claim 2, wherein the first means for initiating tearing overlaps the second means for initiating tearing when the bag is in the lay-flat configuration.

11. The heat-shrinkable bag according to claim 2, wherein the first means for initiating tearing coincides with the second means for initiating tearing when the bag is in the lay-flat configuration.

12. The heat-shrinkable bag according to claim 1, wherein the multilayer film has a total free shrink at 185° F. of from 10 percent to 150 percent, measured using ASTM D-2732.

13. The heat-shrinkable bag according to claim 1, wherein the multilayer film comprises a barrier layer containing at least one member selected from the group consisting of polyvinylidene chloride, saponified ethylene/vinyl acetate copolymer, amorphous polyamide, polyamide MXD6, polyester, and polyacrylonitrile.

14. The heat-shrinkable bag according to claim 1, wherein the multilayer film comprises:
(A) a first layer that is an outer food-contact layer and that also serves as a seal layer, the first layer comprising homogeneous ethylene/alpha-olefin copolymer;
(B) a second layer comprising ethylene/methyl acrylate copolymer;
(C) a third layer comprising a blend of polyamide 6 with polyamide 6I,6T;
(D) a fourth layer comprising EVOH;
(E) a fifth layer comprising a blend of polyamide 6 with polyamide 6I,6T;
(F) a sixth layer comprising ethylene/methyl acrylate copolymer; and
(G) a seventh layer comprising a blend of low density polyethylene and linear low density polyethylene; and
wherein the layers are present in the order of first/second/third/fourth/fifth/sixth/seventh.

15. The heat-shrinkable bag according to claim 1, wherein the multilayer film comprises:
(A) a first layer that is an outer food-contact layer and that also serves as a seal layer, the first layer comprising a blend of ethylene/vinyl acetate copolymer, linear low density polyethylene, and homogeneous ethylene/alpha-olefin copolymer;
(B) a second layer comprising polyvinylidene chloride;
(C) a third layer that comprises a blend of ethylene/vinyl acetate copolymer, linear low density polyethylene, and homogeneous ethylene/alpha-olefin copolymer; and
wherein the layers are present in the order of first/second/third.

16. The heat-shrinkable bag according to claim 1, wherein the multilayer film comprises:
(A) a first layer that is an outer food-contact layer and that also serves as a seal layer, the first layer comprising a blend of homogeneous ethylene/alpha-olefin copolymer and linear low density polyethylene;
(B) a second layer comprising a blend of heterogeneous ethylene/alpha-olefin copolymer and ethylene/vinyl acetate copolymer;
(C) a third layer comprising ethylene/vinyl acetate copolymer;
(D) a fourth layer comprising polyvinylidene chloride;
(E) a fifth layer comprising ethylene/vinyl acetate copolymer;
(F) a sixth layer comprising a blend of heterogeneous ethylene/alpha-olefin copolymer and ethylene/vinyl acetate copolymer; and
(G) a seventh layer comprising a blend of homogeneous ethylene/alpha-olefin copolymer and linear low density polyethylene; and
wherein the layers are present in the order of first/second/third/fourth/fifth/sixth/seventh.

17. The heat-shrinkable bag according to claim 1, wherein the blend of incompatible polymers comprises at least one blend selected from the group consisting of:
(A) a blend of ethylene/alpha-olefin copolymer with ethylene/vinyl acetate copolymer;
(B) a blend of ionomer resin with ethylene/vinyl acetate copolymer, and/or polybutylene, and/or polypropylene;
(C) a blend of ethylene/vinyl acetate copolymer with polypropylene, and/or polybutylene, and/or modified ethylene/vinyl acetate copolymer;
(D) a blend of ethylene/alpha-olefin copolymer with polypropylene and/or polybutylene;

(E) a blend of single site catalyzed polypropylene with homogeneous ethylene/alphaolefin copolymer and/or ethylene/vinyl acetate;

(F) a blend of polypropylene and/or ethylene/propylene copolymer and/or polybutylene with ethylene/methyl acrylate copolymer and/or ethylene/acrylic acid copolymer and/or ethylene/butyl acrylate copolymer; and (G) a blend of polyamide with ethylene/alpha-olefin copolymer and/or ethylene/vinyl acetate copolymer.

18. The heat-shrinkable bag according to claim 1, wherein the first tear and the second tear are each being capable of being propagated in the machine direction.

19. The heat-shrinkable bag according to claim 1, wherein the bag further comprises first and second grip assist means on a first lay-flat side of the bag, and third and fourth grip assist means on the second lay-flat side of the bag, and a first means for tear initiation on the first lay-flat side of the bag between the first and second grip assist means, and a second means for tear initiation on the second lay-flat side of the bag between the third and fourth grip assist means.

20. The heat-shrinkable bag according to claim 19, wherein the first and third grip assist means are coincident and the second and fourth grip assist means are coincident and the first and second means for tear initiation are coincident.

* * * * *